United States Patent
Konishi et al.

(10) Patent No.: US 10,506,675 B2
(45) Date of Patent: Dec. 10, 2019

(54) POWER SUPPLY SYSTEM, LIGHTING DEVICE, AND ILLUMINATION SYSTEM

(71) Applicant: Panasonic Intellectual Property Management Co., Ltd., Osaka (JP)

(72) Inventors: Hirofumi Konishi, Osaka (JP); Kenichi Fukuda, Osaka (JP); Masashi Motomura, Osaka (JP); Kiyoshi Ogasawara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/139,010

(22) Filed: Sep. 22, 2018

(65) Prior Publication Data

US 2019/0104583 A1 Apr. 4, 2019

(30) Foreign Application Priority Data

Sep. 29, 2017 (JP) ................................. 2017-191883

(51) Int. Cl.
| | |
|---|---|
| *H05B 33/00* | (2006.01) |
| *H05B 33/08* | (2006.01) |
| *H02M 3/335* | (2006.01) |
| *H02M 3/155* | (2006.01) |

(52) U.S. Cl.
CPC ..... *H05B 33/0815* (2013.01); *H05B 33/0887* (2013.01); *H02M 3/155* (2013.01); *H02M 3/33507* (2013.01); *H02M 3/33569* (2013.01)

(58) Field of Classification Search
CPC .... H05B 33/0815; H05B 37/02; H05B 33/08; H05B 33/0824; H05B 33/083; H05B 33/0848; H05B 41/2928; H05B 41/38
See application file for complete search history.

(56) References Cited

U.S. PATENT DOCUMENTS

| | | |
|---|---|---|
| 2011/0316444 A1 | 12/2011 | Terasaka |
| 2017/0188420 A1* | 6/2017 | Kido ..................... H04B 10/116 |

FOREIGN PATENT DOCUMENTS

JP 2012-009772 A 1/2012

\* cited by examiner

*Primary Examiner* — Monica C King
(74) *Attorney, Agent, or Firm* — Renner, Otto, Boisselle & Sklar, LLP

(57) ABSTRACT

A power supply system includes a power supply circuit and an output unit. The power supply circuit generates a pulsating voltage. The output unit is to be connected to a pair of electric wires to apply the pulsating voltage to the pair of electric wires. The power supply circuit generates the pulsating voltage such that the pulsating voltage has a full-wave rectified waveform obtained by full-wave rectifying an alternating voltage as a wave alternating between a positive voltage and a negative voltage.

29 Claims, 18 Drawing Sheets

POWER SUPPLY SYSTEM, LIGHTING DEVICE, AND ILLUMINATION SYSTEM

CROSS-REFERENCE TO RELATED APPLICATION

This application claims the benefit of foreign priority to Japanese Patent Application No. 2017-191883 filed on Sep. 29, 2017, the entire contents of which are hereby incorporated by reference.

TECHNICAL FIELD

The present disclosure generally relates to power supply systems, lighting devices, and illumination systems.

BACKGROUND ART

A light fixture has been known in the art which lights a semiconductor light-emitting element (light source) by supplying a constant direct current from a power supply circuit to a light-emitting module. For example, according to Japanese Unexamined Patent Application Publication No. 2012-9772, a power supply circuit and a semiconductor light-emitting element are housed in a single light fixture, and the power supply circuit outputs a current with a trapezoidal waveform, thereby lighting the semiconductor light-emitting element.

When located distant from each other, a power supply circuit and a light source are connected together via an electric wire. In that case, however, contact failure occurring at a connection point of any electric wire could generate arc discharge at the connection point. Particularly when direct current (DC) power is supplied from the power supply circuit to the light source, the arc discharge tends to continue for a significant amount of time.

SUMMARY

The present disclosure provides a power supply system, a lighting device, and an illumination system, all of which are configured to reduce the chances of arc discharge continuing for a significant amount of time when DC power is supplied to a light source through an electric wire connected to an output unit.

A power supply system according to an aspect of the present disclosure is configured to output a DC pulsating voltage to a pair of electric wires through which load power is supplied to a light source. The power supply system includes: a power supply circuit configured to generate the pulsating voltage; and an output unit to be connected to the pair of electric wires to apply the pulsating voltage to the pair of electric wires. The power supply circuit generates the pulsating voltage such that the pulsating voltage has a full-wave rectified waveform obtained by full-wave rectifying an alternating voltage as a wave alternating between a positive voltage and a negative voltage.

A lighting device according to another aspect of the present disclosure is to be supplied with DC power through the pair of electric wires from the power supply system described above. The lighting device includes a lighting circuit configured to supply the load power to the light source. The lighting circuit is implemented as a power-factor correction circuit configured to regulate an amount of a current flowing through the pair of electric wires into the lighting circuit to increase a power factor of alternating current (AC) power to be input to the power supply circuit.

A lighting device according to still another aspect of the present disclosure is to be supplied with DC power through the pair of electric wires from the power supply system described above. The lighting device includes: a lighting circuit configured to supply the load power to the light source; and a communications unit configured to demodulate the signal based on a voltage between the pair of electric wires. The lighting circuit regulates the load power based on the signal that has been demodulated by the communications unit.

A lighting device according to yet another aspect of the present disclosure is to be supplied with DC power through the pair of electric wires from the power supply system described above. The lighting device includes: a lighting circuit configured to supply the load power to the light source; and a communications unit configured to demodulate the signal by detecting the output conduction angle based on a voltage between the pair of electric wires. The lighting circuit regulates the load power based on the signal that has been demodulated by the communications unit.

An illumination system according to yet another aspect of the present disclosure includes the power supply system described above; the lighting device described above; and the pair of electric wires configured to electrically connect the power supply system and the lighting device together.

BRIEF DESCRIPTION OF DRAWINGS

The figures depict one or more implementations in accordance with the present teachings, by way of example only, not by way of limitations. In the figures, like reference numerals refer to the same or similar elements.

DESCRIPTION OF EMBODIMENTS

The following embodiments generally relate to power supply systems, lighting devices, and illumination systems, and more particularly relate to a power supply system to which DC power is supplied through an electric wire, and a lighting device and illumination system including such a power supply system.

Power supply systems, lighting devices, and illumination systems according to various embodiments of the present disclosure may be used indoors in various types of facilities including offices, factories, and stores, and may also be used outdoors on roads, in tunnels, and on playing fields, for example. Power supply systems, lighting devices, and illumination systems according to various embodiments may also be used in numerous types of dwellings including single-family dwellings and multi-family dwellings.

Embodiments of the present disclosure will now be described with reference to the accompanying drawings.

First Embodiment

Figure 1:
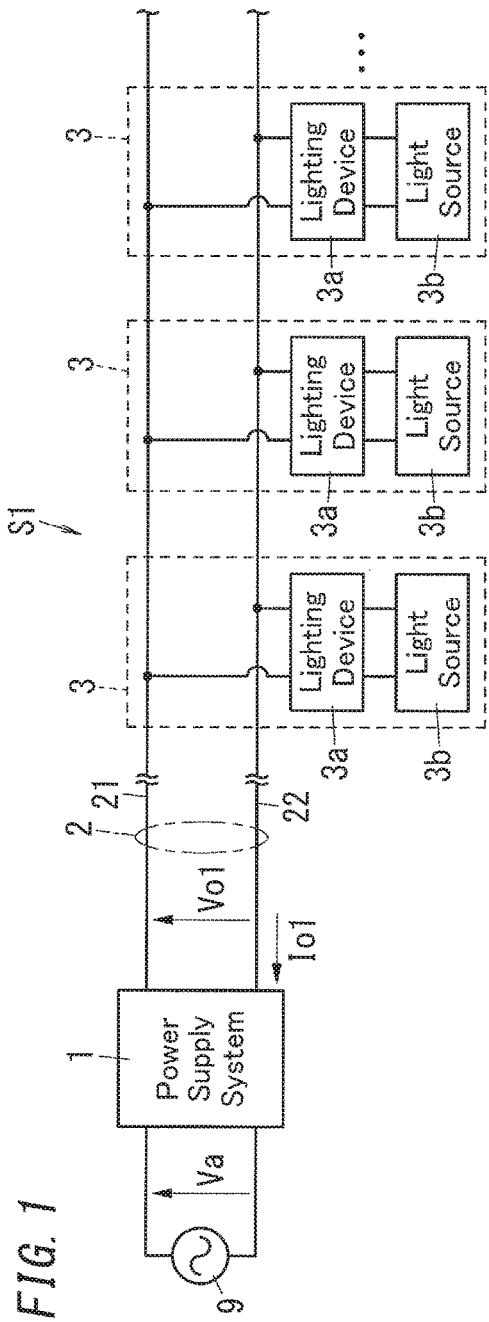
FIG. 1 is a block diagram illustrating an illumination system according to a first embodiment of the present disclosure.

An illumination system S1 according to a first embodiment includes a power supply system 1, a power cable 2, and light fixtures 3 as shown in FIG. 1.

The power supply system 1 is configured to be supplied with alternating current (AC) power from a utility power supply 9 and output DC power. The power supply system 1 receives, as an input voltage Va, an AC voltage from the utility power supply 9, converts the AC input voltage Va into a DC pulsating voltage Vo1, and outputs the DC pulsating voltage Vo1 to the cable 2. The utility power supply 9 may be either a 100 V power grid or a 200 V power grid, and supplies AC power with a commercial frequency of 50 Hz or 60 Hz.

The cable 2 includes a pair of electric wires 21 and 22. The pulsating voltage Vo1 is applied between the electric wires 21 and 22. The cable 2 may be a Cabtyre cable or a Cabtyre code, for example, and the cross-sectional area of the pair of electric wires 21 and 22 is determined by the output capacity of the power supply system 1, the number of the light fixtures 3 connected, and other factors. In this embodiment, the pair of electric wires 21 and 22 may have a cross-sectional area of 1.25 mm$^2$, for example.

Note that the electric wires 21 and 22 do not have to be implemented as such a cable 2, but may also be implemented as a feeder duct or a conductor bar, for example.

The light fixtures 3 are connected to the pair of electric wires 21 and 22, and configured to emit light with the DC power supplied through the pair of electric wires 21 and 22 from the power supply system 1 and illuminate the target space with the light. In this embodiment, these light fixtures 3 are connected in parallel with each other to the pair of electric wires 21 and 22.

Figure 2:
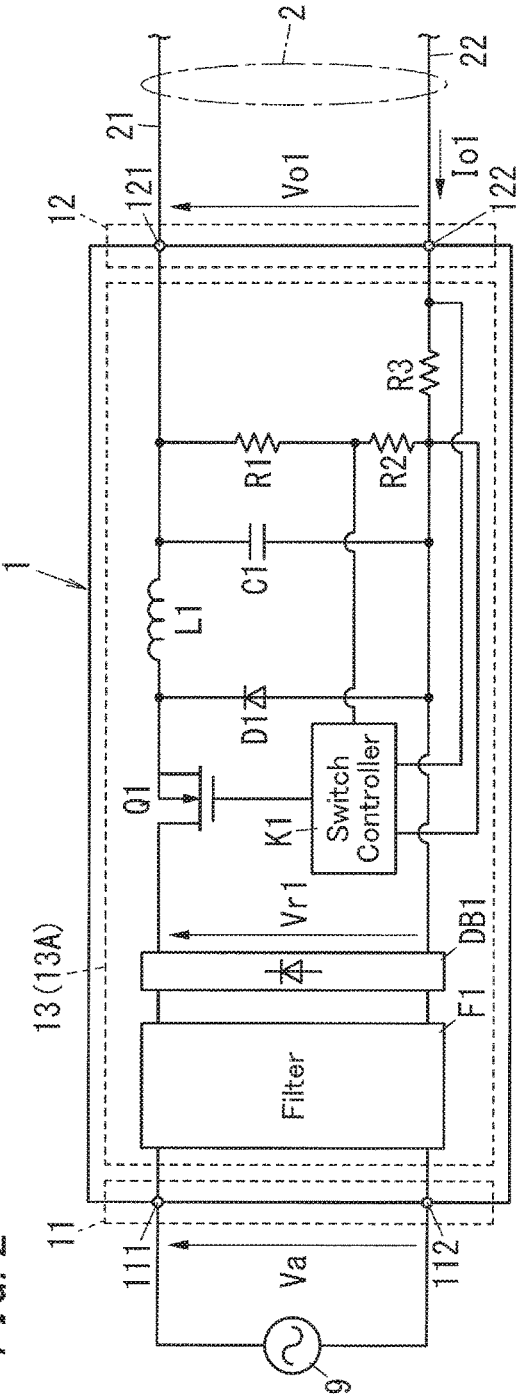
FIG. 2 is a circuit diagram illustrating a power supply system according to the first embodiment.

The power supply system 1 according to this embodiment will now be described. As shown in FIG. 2, the power supply system 1 includes an input unit 11, an output unit 12, and a power supply circuit 13.

The input unit 11 includes a pair of input terminals 111 and 112, to which the input voltage Va is applied. The input unit 11 may be implemented as connectors or a terminal block, for example.

The output unit 12 includes a pair of output terminals 121 and 122, to which the electric wires 21 and 22 are respectively connected. The output unit 12 may be implemented as connectors or a terminal block, which is connectible to the pair of electric wires 21 and 22 in a readily disconnectable state.

The power supply circuit 13 includes a power converter circuit 13A implemented as voltage-step down chopper circuit, for example. The power converter circuit 13A includes a filter F1, a rectifier DB1, a switching element Q1, a diode D1, an inductor L1, a capacitor C1, resistors R1, R2, and R3, and a switch controller K1.

The filter F1 is electrically connected to the pair of input terminals 111 and 112 and receives the input voltage Va. The filter F1 includes a noise-reducing inductor, a noise-reducing capacitor, and a surge absorber, and attenuates unnecessary frequency components (such as radio frequency noise) and signal components.

The rectifier DB1 may be a full-wave rectifier circuit implemented as a diode bridge, for example, to full-wave rectify the input voltage Va, supplied from the filter F1, and thereby output a rectified voltage Vr1. The rectified voltage Vr1 comes to have a full-wave rectified waveform, obtained by full-wave rectifying the input voltage Va.

Between the output terminals of the rectifier DB1, connected is a series circuit of the switching element Q1, the inductor L1, and the capacitor C1. Specifically, the switching element Q1, the inductor L1, and the capacitor C1 are connected in this order from a positive output terminal of the rectifier DB1 toward a negative output terminal thereof. In addition, the diode D1 is connected in parallel with the series circuit of the inductor L1 and the capacitor C1. The diode D1 has its anode connected to the negative output terminal of the rectifier DB1 and its cathode connected to a connection node between the switching element Q1 and the inductor L1. The capacitor C1 has its positive electrode connected to the output terminal 121 and has its negative electrode connected to the output terminal 122. A series circuit of the resistors R1 and R2 is connected between the two terminals of the capacitor C1. The other resistor R3 is inserted into an electric path between the output terminal 122 and the negative electrode of the capacitor C1.

The switch controller K1 performs switching control of turning the switching element Q1 ON and OFF by driving the switching element Q1 at high frequencies (falling within the range from a few ten kHz to several MHz). Turning the switching element Q1 ON and OFF repeatedly generates the pulsating voltage Vo1 between the two terminals of the capacitor C1 by stepping down the rectified voltage Vr1. The pulsating voltage Vo1 is then output from the output unit 12. Note that although the switching element Q1 of this embodiment is implemented as a field effect transistor (FET), the switching element may also be any other type of semiconductor switching element such as an insulated gate bipolar transistor (IGBT), a junction type transistor, or a bipolar transistor.

The voltage at the connection node between the resistors R1 and R2 is obtained by dividing the pulsating voltage Vo1 by the resistance of the resistors R1 and R2. The switch controller K1 monitors the pulsating voltage Vo1 by acquiring the voltage at the connection node between the resistors R1 and R2 as output voltage data.

An output current Io1 of the power supply circuit 13 flows through the resistor R3. Thus, the voltage between the two terminals of the resistor R3 has a value proportional to the output current Io1 of the power supply circuit 13. The switch controller K1 monitors the output current Io1 by acquiring, as output current data, the voltage between the two terminals of the resistor R3.

Figure 3A:
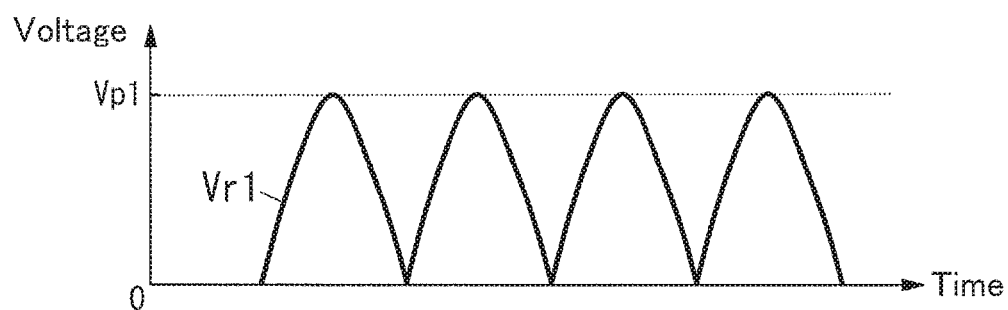
FIG. 3A is a waveform diagram illustrating a rectified voltage for the power supply system according to the first embodiment.
Figure 3B:
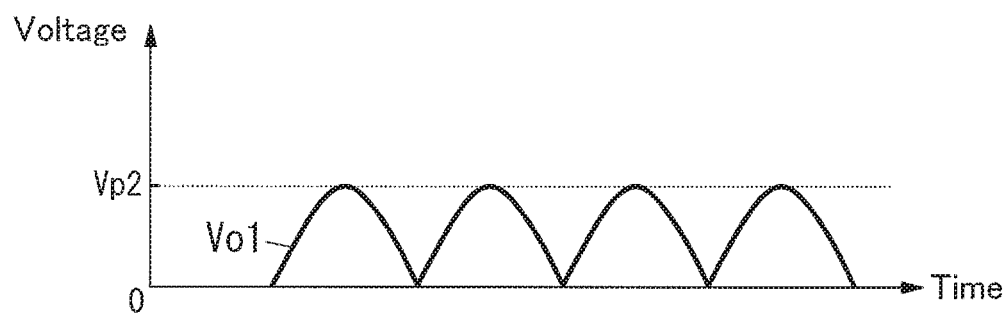
FIG. 3B is a waveform diagram illustrating a pulsating voltage according to the first embodiment.

The switch controller K1 turns the switching element Q1 ON and OFF at high frequencies based on the output voltage data and the output current data to generate the pulsating voltage Vo1 by stepping down the rectified voltage Vr1. As shown in FIGS. 3A and 3B, the pulsating voltage Vo1 has a full-wave rectified waveform of the same phase as the rectified voltage Vr1, and the peak value Vp2 of the pulsating voltage Vo1 becomes smaller than the peak value Vp1 of the rectified voltage Vr1. For example, the peak value Vp1 of the rectified voltage Vr1 is approximately 141 V (or 282 V), and the peak value Vp2 of the pulsating voltage Vo1 may be controlled at a constant value of 36 V. Also, when the output current data exceeds a rated value, the switch controller K1 either reduces or stops outputting, the pulsating voltage Vo1.

The pair of electric wires 21 and 22 are respectively connected to the pair of output terminals 121 and 122. The pulsating voltage Vo1 is applied between the pair of electric wires 21 and 22. The plurality of light fixtures 3 are connected to the pair of electric wires 21 and 22 and are supplied with DC power from the power supply system 1 through the pair of electric wires 21 and 22. Each of the plurality of light fixtures 3 includes a lighting device 3a and a light source 3b. The lighting device 3a converts the DC power, supplied from the power supply system 1 through the pair of electric wires 21 and 22, into load power to light the light source 3b and supplies the load power to the light source 3b.

In this illumination system S1, the power supply system 1 applies the pulsating voltage Vo1 with the full-wave rectified waveform to the pair of electric wires 21 and 22. The pulsating voltage Vo1 with the full-wave rectified waveform periodically decreases to either 0 V or a low voltage close to 0 V. That is why even if arc discharge is generated, for example, at a node to which the electric wire 21 or 22 is connected (e.g., at the output unit 12) or at a node where the electric wire 21 or 22 is disconnected, the chances of arc extinction will increase, and the chances of the arc discharge continuing will decrease, when the pulsating voltage Vo1 decreases periodically.

The power supply system 1 may be implemented as either a single apparatus or a combination of a plurality of apparatuses.

Figure 4:
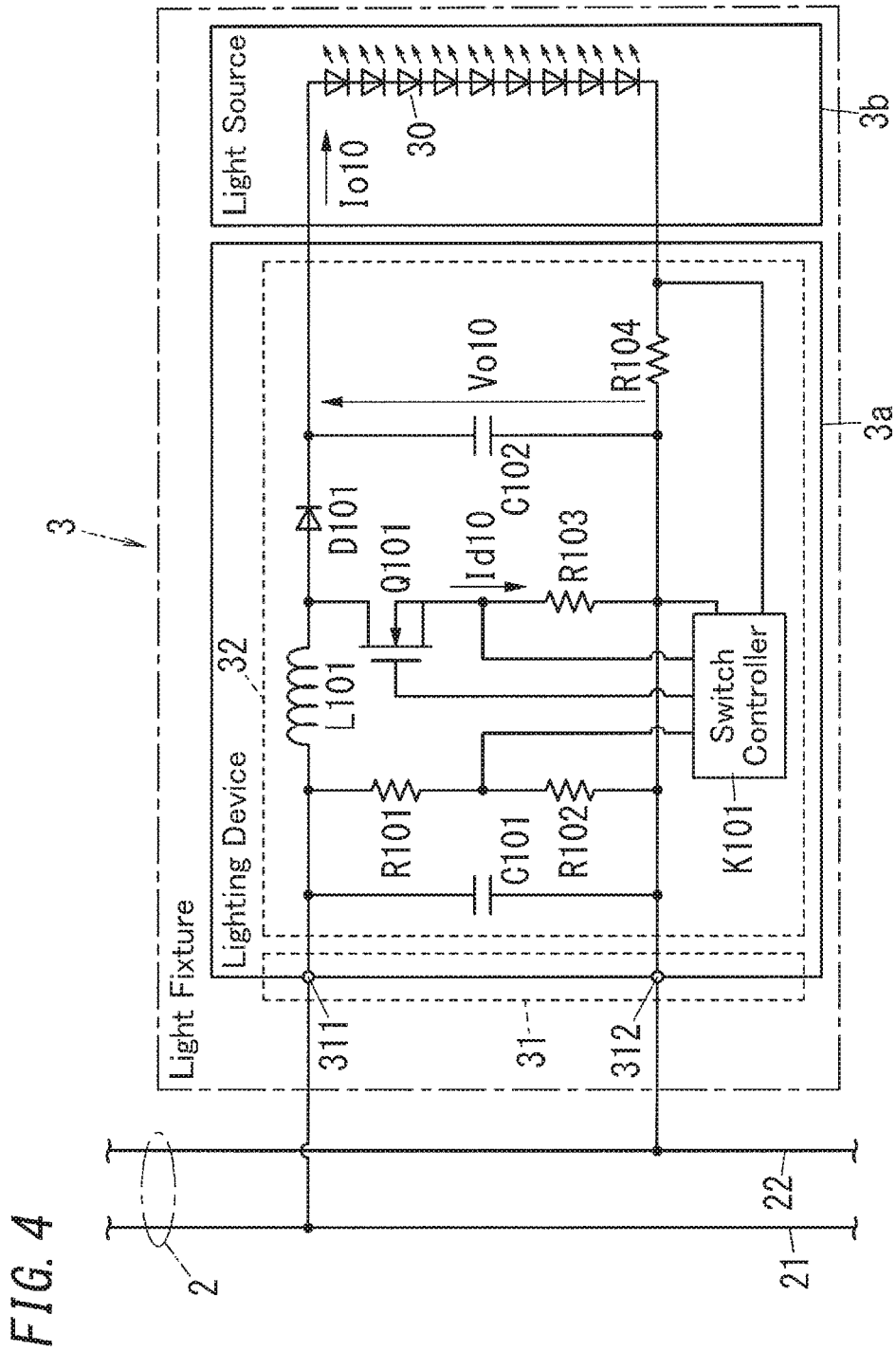
FIG. 4 is a circuit diagram illustrating a light fixture according to the first embodiment.

Each light fixture 3 includes the lighting device 3a and the light source 3b as shown in FIG. 4.

The lighting device 3a includes an input unit 31 and a lighting circuit 32.

The input unit 31 includes a pair of input terminals 311 and 312. The electric wires 21 and 22 are connected to the input terminals 311 and 312, respectively. The input unit 31 is configured to be connectible and disconnectable both electrically and mechanically to/from the power cable 2 and may be implemented as a connector, a terminal block, or a blade, for example.

The lighting circuit 32 includes capacitors C101 and C102, an inductor L101, a switching element Q101, a diode D101, resistors R101-R104, and a switch controller K101, all of which form a voltage step-up chopper circuit.

The capacitor C101 is connected between the pair of input terminals 311 and 312. The pulsating voltage Vo1 is applied to the capacitor C101. A series circuit of the resistors R101 and R102 is connected between the two terminals of the capacitor C101. A series circuit of the inductor L101, the switching element Q101, and the resistor R103 is connected between the input terminals 311 and 312. The inductor L101, the switching element Q101, and the resistor R103 are connected in this order from the input terminal 311 toward the input terminal 312. A series circuit of the diode D101 and the capacitor C102 is connected to the series circuit of the switching element Q101 and the resistor R103. The diode D101 has its anode connected to a connection node between the inductor L101 and the switching element Q101, and has its cathode connected to the positive electrode of the capacitor C102.

The light source 3b is connected between the two terminals of the capacitor C102. The light source 3b includes a plurality of solid-state light-emitting elements. For example, a plurality of light-emitting diodes (LEDs) 30 may be connected together in series. These LEDs 30 are connected such that the forward direction of each of these LEDs 30 is defined to be a direction in which a current flow from the positive electrode of the capacitor C102 toward the negative electrode thereof.

The switch controller K101 performs switching control of turning the switching element Q11 ON and OFF by ON/OFF driving the switching element Q101 at high frequencies. Turning the switching element Q101 ON and OFF repeatedly generates a DC load voltage Vol0 between the two terminals of the capacitor C102 by stepping up and smoothing the pulsating voltage Vo1. The load voltage Vol0 is applied between the two terminals of the light source 3b. The light source 3b emits light when a load current flows through it upon the application of the load voltage Vo10. Note that although the switching element Q101 of this embodiment is implemented as an FET, the switching element may also be any other type of semiconductor switching element such as an IGBT, a junction type transistor, or a bipolar transistor.

The voltage at the connection node between the resistors R101 and R102 is obtained by dividing the pulsating voltage Vo1 by the resistance of the resistors R101 and R102. The switch controller K101 monitors the pulsating voltage Vo1 by acquiring the voltage at the connection node between the resistors R101 and R102 as input voltage data.

A drain current Id10 of the switching element Q101 flows through the resistor R103. Thus, the voltage between the two terminals of the resistor R103 has a value proportional to the drain current Id10. The switch controller K101 monitors the drain current Id10 by acquiring, as drain current data, the voltage between the two terminals of the resistor R103.

The load current Io10 also flows through the resistor R103. Thus, the voltage between the two terminals of the resistor R103 has a value proportional to the load current Io10. The switch controller K101 monitors the load current Io10 by acquiring, as load current data, the voltage between the two terminals of the resistor R103.

The switch controller K101 turns the switching element Q101 ON and OFF at high frequencies based on the input voltage data, the drain current data, and the load current data to generate the load voltage Vol0 by stepping up and smoothing the pulsating voltage Vo1 and perform constant current control on the load current Io10 to be supplied to the light source 3b. In this embodiment, the pulsating voltage Vo1 as a full-wave rectified waveform has a peak value of 36 V and the DC load voltage Vol0 is controlled at about 60 V. Then, the switch controller K101 performs constant current control based on the load current data such that the load current Io10 becomes 150 mA, for example.

In this case, the lighting circuit 32 also functions as a power factor correction circuit, and regulates the amount of current to flow from the pair of electric wires 21 and 22 into the lighting circuit 32 so as to increase the power factor of the AC power to be supplied to the power supply circuit 13. Specifically, the switch controller K101 makes the lighting circuit 32 operate as a power factor correction circuit based on the input voltage data and the drain current data such that the waveform of the current supplied through the pair of electric wires 21 and 22 to the lighting circuit 32 matches (or at least becomes similar to) the waveform of the pulsating voltage Vo1.

The lighting device 3a functions as a power factor correction circuit, and therefore, is able to increase the power factor of the AC power supplied from the utility power supply 9 to the power supply system 1, compared to a situation where the lighting device 3a does not function as a power factor correction circuit.

First Variation of First Embodiment

Figure 5:
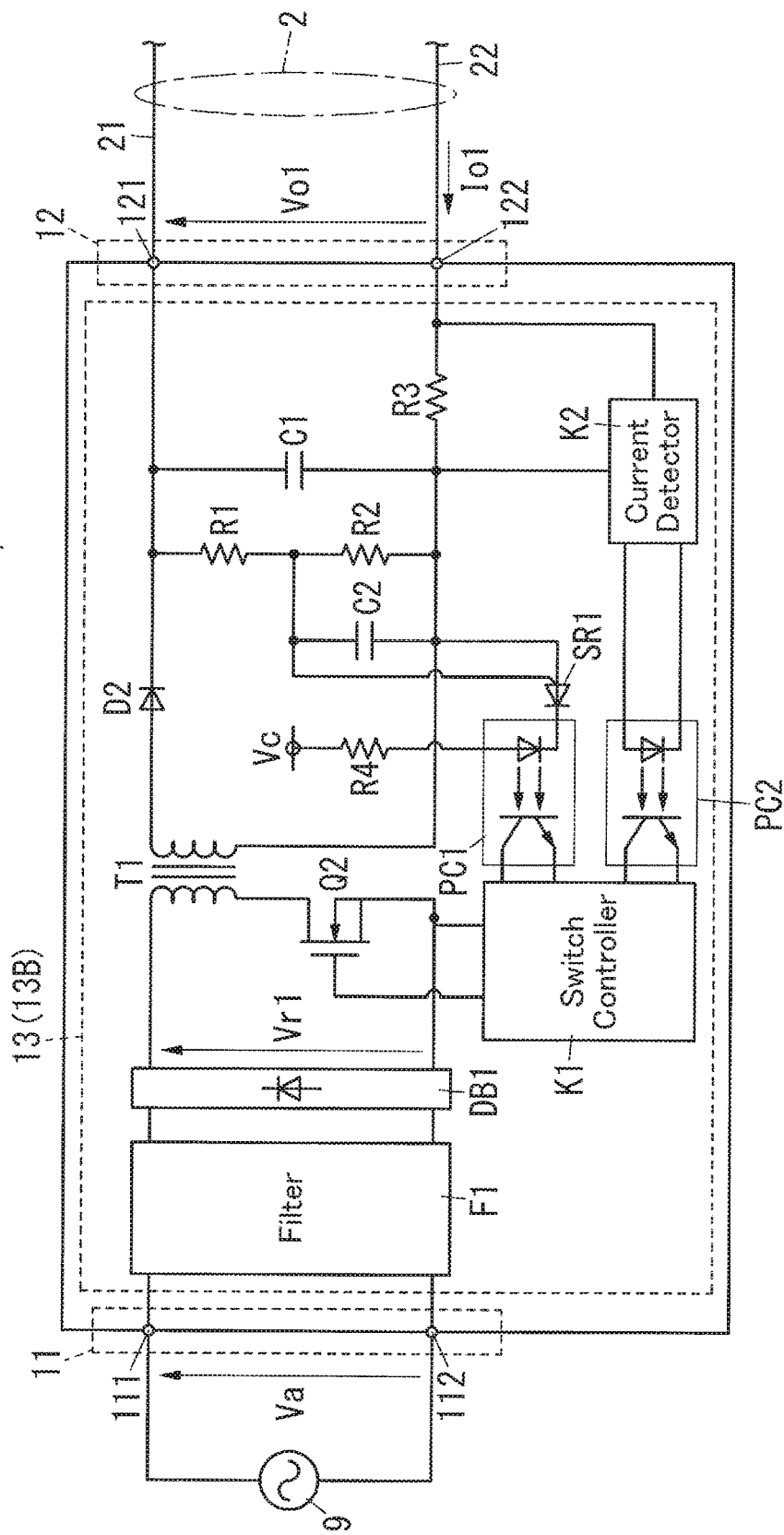
FIG. 5 is a circuit diagram illustrating a power supply system according to a first variation of the first embodiment.

FIG. 5 illustrates a configuration for a power supply system 1 according to a first variation.

The power supply circuit 13 includes a power converter circuit 13B, which is implemented as an insulated flyback converter. The power converter circuit 13B includes a filter F1, a rectifier DB1, a transformer T1, a switching element Q2, a diode D2, capacitors C1 and C2, resistors R1-R4, photocouplers PC1 and PC2, a shunt regulator SR1, a switch controller K1, and a current detector K2.

The transformer T1 is a reinforced insulation flyback transformer. Between the output terminals of the rectifier DB1, connected is a series circuit of a primary winding of the transformer T1 and the switching element Q2. Specifically, the primary winding of the transformer T1 and the switching element Q2 are connected in this order from a positive output terminal of the rectifier DB1 toward a negative output terminal thereof. In addition, a series circuit of the diode D2 and the capacitor C1 is connected between the terminals of a secondary winding of the transformer T1. The diode D2 has its anode connected to one terminal of the secondary winding of the transformer T1 and its cathode connected to the positive electrode of the capacitor C1. The capacitor C1 has its positive electrode connected to the output terminal 121 and has its negative electrode connected to the output terminal 122. A series circuit of the resistors R1 and R2 is connected between the two terminals of the capacitor C1. The capacitor C2 is connected in parallel with the resistor R2. Another resistor R3 is inserted into an electric path between the output terminal 122 and the negative electrode of the capacitor C1.

The switch controller K1 performs switching control of turning the switching element Q2 ON and OFF by ON/OFF driving the switching element Q2 at high frequencies (falling within the range from a few ten kHz to several MHz). Turning the switching element Q2 ON and OFF repeatedly generates the pulsating voltage Vo1 between the two terminals of the capacitor C1 by stepping down the rectified voltage Vr1. The pulsating voltage Vo1 is then output from the output unit 12. Note that although the switching element Q2 is implemented as an FET in this embodiment, the switching element may also be any other type of semiconductor switching element such as an IGBT, a junction type transistor, or a bipolar transistor.

In this case, the voltage at the connection node between the resistors R1 and R2 has been smoothed by the capacitor C2, and the voltage between the two terminals of the capacitor C2 corresponds to an average value of the pulsating voltage Vo1. In addition, a series circuit of the resistor R4, the light-emitting diode of the photocoupler PC1, and the shunt regulator SR1 is connected between the high voltage node of a control voltage Vc and the negative electrode of the capacitor C1. The shunt regulator SR1 regulates the amount of current flowing through itself in accordance with the difference of the voltage between the two terminals of the capacitor C2 from a reference voltage. As a result, the amount of current flowing through the light-emitting diode of the photocoupler PC1 increases or decreases according to the voltage between the two terminals of the capacitor C2. The emitter and collector of a phototransistor of the photocoupler PC1 are connected to input ports of the switch controller K1. The switch controller K1 monitors the pulsating voltage Vo1 by acquiring, as output voltage data, the current flowing through the phototransistor of the photocoupler PC1.

The current detector K2 receives the voltage between the two terminals of the resistor R3 and supplies an amount of current to the light-emitting diode of the photocoupler PC2 in accordance with the voltage between the two terminals of the resistor R3. The emitter and collector of the phototransistor of the photocoupler PC2 are connected to input ports of the switch controller K1. The switch controller K1 monitors the output current Io1 by acquiring an ON/OFF signal of the phototransistor of the photocoupler PC2 as output current data. That is to say, the current detector K2 and the photocoupler PC2 perform analog-to-digital conversion (AD conversion) on the value of the output current Io1. When the output current Io1 exceeds a rated value, the phototransistor of the photocoupler PC2 turns ON.

The switch controller K1 turns the switching element Q2 ON and OFF at high frequencies based on the output voltage data and the output current data to generate the pulsating voltage Vo1 by stepping down the rectified voltage Vr1. Also, when the phototransistor of the photocoupler PC2 turns ON, the switch controller K1 either reduces, or stops outputting, the pulsating voltage Vo1.

In this variation, the transformer T1 and the photocouplers PC1 and PC2 together serve as an insulating circuit for electrically insulating the input unit 11 and the output unit 12 from each other.

Second Variation of First Embodiment

Figure 6:
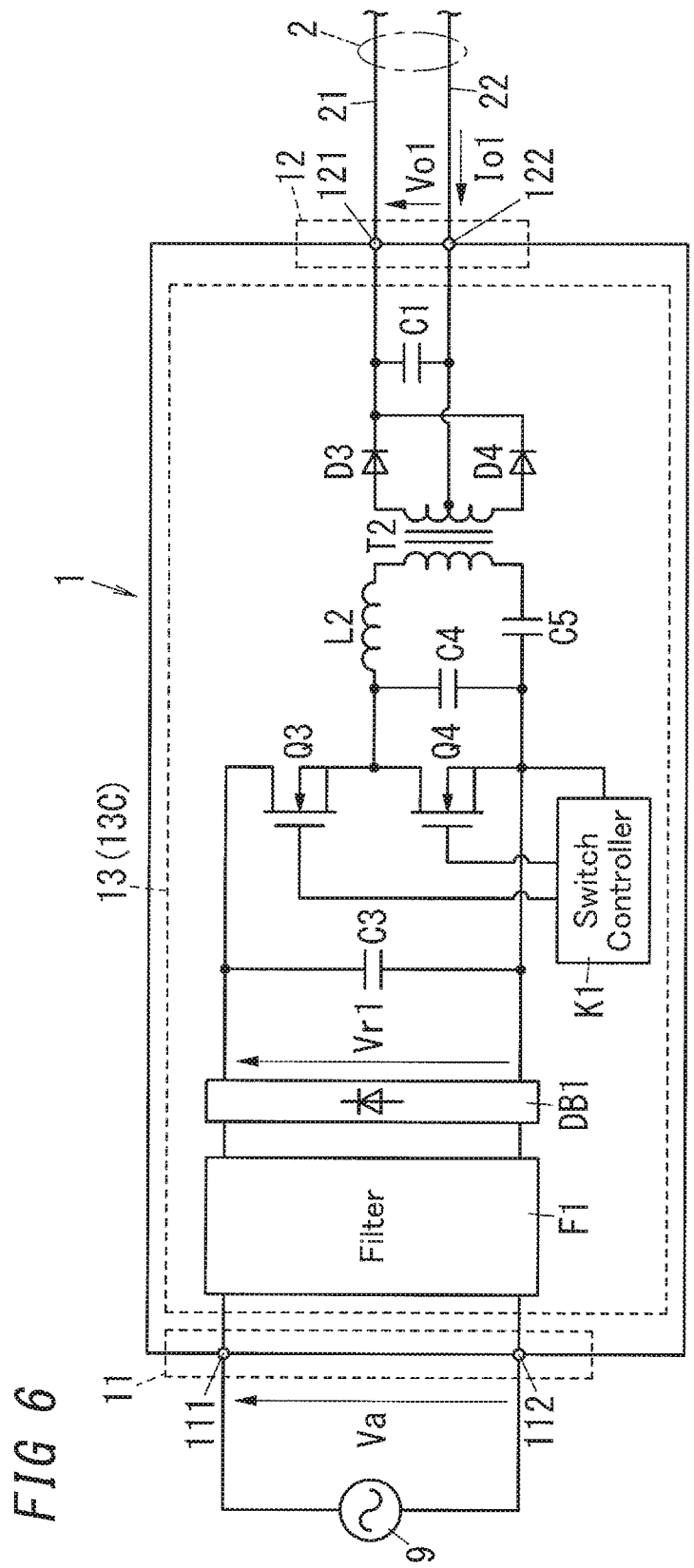
FIG. 6 is a circuit diagram illustrating a power supply system according to a second variation of the first embodiment.

FIG. 6 illustrates a configuration for a power supply system 1 according to a second variation of the first embodiment.

The power supply circuit 13 includes a power converter circuit 13C, which is implemented as an LLC resonance converter. The power converter circuit 13C includes a filter F1, a rectifier DB1, switching elements Q3 and Q4, a transformer T2, diodes D3 and D4, capacitors C1 and C3-C5, an inductor L2, and a switch controller K1. Note that in FIG. 6, components for generating output voltage data and output current data, such as the resistors R1-R3, the capacitor C2, the photocouplers PC1 and PC2, the shunt regulator SR1, and the current detector K2, are not illustrated.

The capacitor C3 is connected between the output terminals of the rectifier DB1. A series circuit of a high-side switching element Q3 and a low-side switching element Q4 is connected between the two terminals of the capacitor C3. The capacitor C4 is connected between the drain and emitter of the switching element Q4. In addition, a series circuit of the inductor L2, a primary winding of the transformer T2, and the capacitor C5 is connected between the drain and emitter of the switching element Q4.

The respective anodes of the diodes D3 and D4 are connected to the two terminals of a secondary winding of the transformer T2, and the respective cathodes of the diodes D3 and D4 are connected to a positive electrode of the capacitor C1. A neutral point of the secondary winding of the transformer T2 is connected to a negative electrode of the capacitor C1. Output terminals 121 and 122 are respectively connected to the positive and negative electrodes of the capacitor C1. Note that the transformer T2 is a reinforced insulation transformer.

The switch controller K1 performs switching control of alternately turning the switching elements Q3 and Q4 ON and OFF by ON/OFF driving the switching elements Q3 and Q4 at high frequencies (falling within the range from a few ten kHz to several MHz). Turning the switching elements Q3 and Q4 ON and OFF alternately causes the inductor L2, a primary winding of the transformer T2, and the capacitor C5 to produce resonance. Then, an AC voltage is generated between two terminals of a secondary winding of the transformer T2 by stepping down the input voltage Va. The AC voltage that has been stepped down is full-wave rectified by the diodes D3 and D4. As a result, a pulsating voltage Vo1, lower than the input voltage Va, is generated between the two terminals of the capacitor C1 and output through the output unit 12. Note that although the switching elements Q3 and Q4 of this embodiment are implemented as FETs, the switching elements may also be any other type of semiconductor switching elements such as IGBTs, junction type transistors, or bipolar transistors.

The switch controller K1 performs switching control on the switching elements Q3 and Q4 based on the output voltage data and the output current data in the same way as in the first variation described above.

According to this variation, the input unit 11 and the output unit 12 are also electrically insulated from each other by an insulating circuit such as the transformer T2 as in the first variation described above.

Third Variation of First Embodiment

Figure 7:
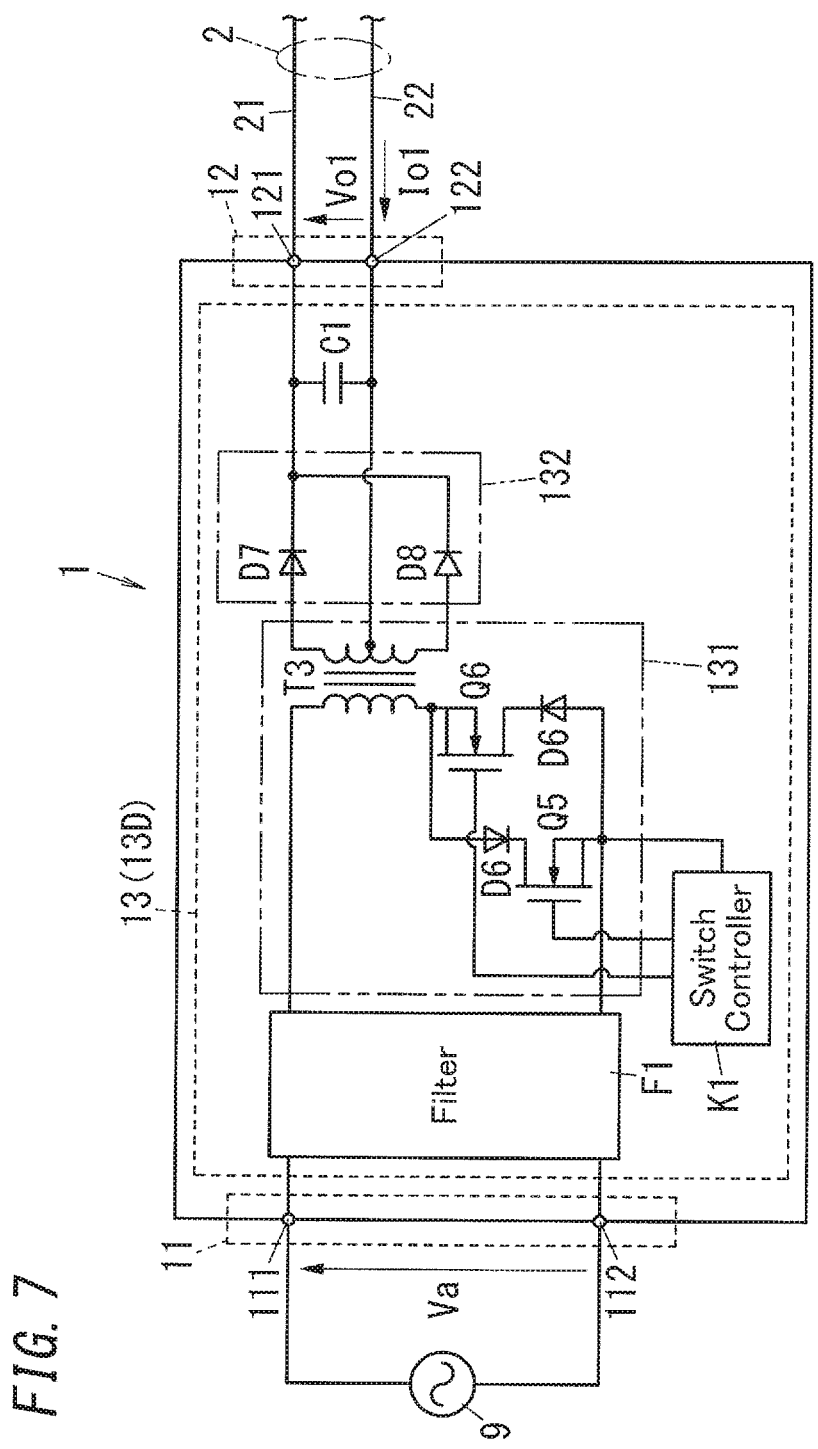
FIG. 7 is a circuit diagram illustrating a power supply system according to a third variation of the first embodiment.

FIG. 7 illustrates a configuration for a power supply system 1 according to a third variation of the first embodiment.

The power supply circuit 13 includes a power converter circuit 13D, which is implemented as an insulated flyback converter. The power converter circuit 13D includes a filter F1, switching elements Q5 and Q6, a transformer T3, diodes D5-D8, a capacitor C1, and a switch controller K1. Note that in FIG. 7, components for generating output voltage data and output current data, such as the resistors R1-R3, the capacitor C2, the photocouplers PC1 and PC2, the shunt regulator SR1, and the current detector K2, are not illustrated.

Between the output terminals of the filter F1, connected is a series circuit of a primary winding of the transformer T3, the diode D5, and the switching element Q5. A series circuit of the diode D6 and the switching element Q6 is connected in inverse-parallel with a series circuit of the diode D5 and the switching element Q5.

The diode D5 has its anode connected to the primary winding of the transformer T3 and has its cathode connected to the drain of the switching element Q5. The switching element Q6 has its source connected to the primary winding of the transformer T3 and has its drain connected to the cathode of the diode D6. That is to say, the series circuit of the diode D5 and the switching element Q5 and the series circuit of the diode D6 and the switching element Q6 are connected in parallel so as to be inverse to each other.

The respective anodes of the diodes D7 and D8 are connected to the two terminals of a secondary winding of the transformer T3, and the respective cathodes of the diodes D7 and D8 are connected to a positive electrode of the capacitor C1. A neutral point of the secondary winding of the transformer T3 is connected to a negative electrode of the capacitor C1. Output terminals 121 and 122 are respectively connected to the positive and negative electrodes of the capacitor C1. Note that the transformer T3 is a reinforced insulation flyback transformer.

The switch controller K1 performs switching control of ON/OFF driving the switching elements Q5 and Q6 at high frequencies (falling within the range from a few ten kHz to several MHz). During a positive half cycle of the input voltage Va, the switching element Q5 repeatedly turns ON and OFF at high frequencies. During a negative half cycle of the input voltage Va, the switching element Q6 repeatedly turns ON and OFF at high frequencies.

Then, an AC voltage is generated between two terminals of the secondary winding of the transformer T3 by stepping down the input voltage Va. The AC voltage that has been stepped down is full-wave rectified by the diodes D7 and D8. As a result, a pulsating voltage Vo1, lower than the input voltage Va, is generated between the two terminals of the capacitor C1 and output through the output unit 12. Note that although the switching elements Q5 and Q6 of this embodiment are implemented as FETs, the switching elements may also be any other type of semiconductor switching elements such as IGBTs, junction type transistors, or bipolar transistors.

The switch controller K1 performs switching control on the switching elements Q5 and Q6 based on the output voltage data and the output current data in the same way as in the first variation described above.

In this variation, the switching elements Q5 and Q6, the diodes D5 and D6, and the transformer T3 together form a voltage step-down circuit 131, which generates an AC voltage between the two terminals of the secondary winding of the transformer T3 by stepping down the input voltage Va. Meanwhile, the diodes D7 and D8 form a rectifier circuit 132, which full-wave rectifies the AC voltage between the two terminals of the secondary winding of the transformer T3.

Thus, the rectifier circuit 132 is provided to follow the voltage step-down circuit 131, and therefore, diodes with a relatively low breakdown voltage may be used as the diodes D7 and D8 of the rectifier circuit 132. This reduces the size and cost of the power supply circuit 13.

In addition, the input unit 11 and the output unit 12 are also electrically insulated from each other as in the first variation described above.

Second Embodiment

Figure 8:
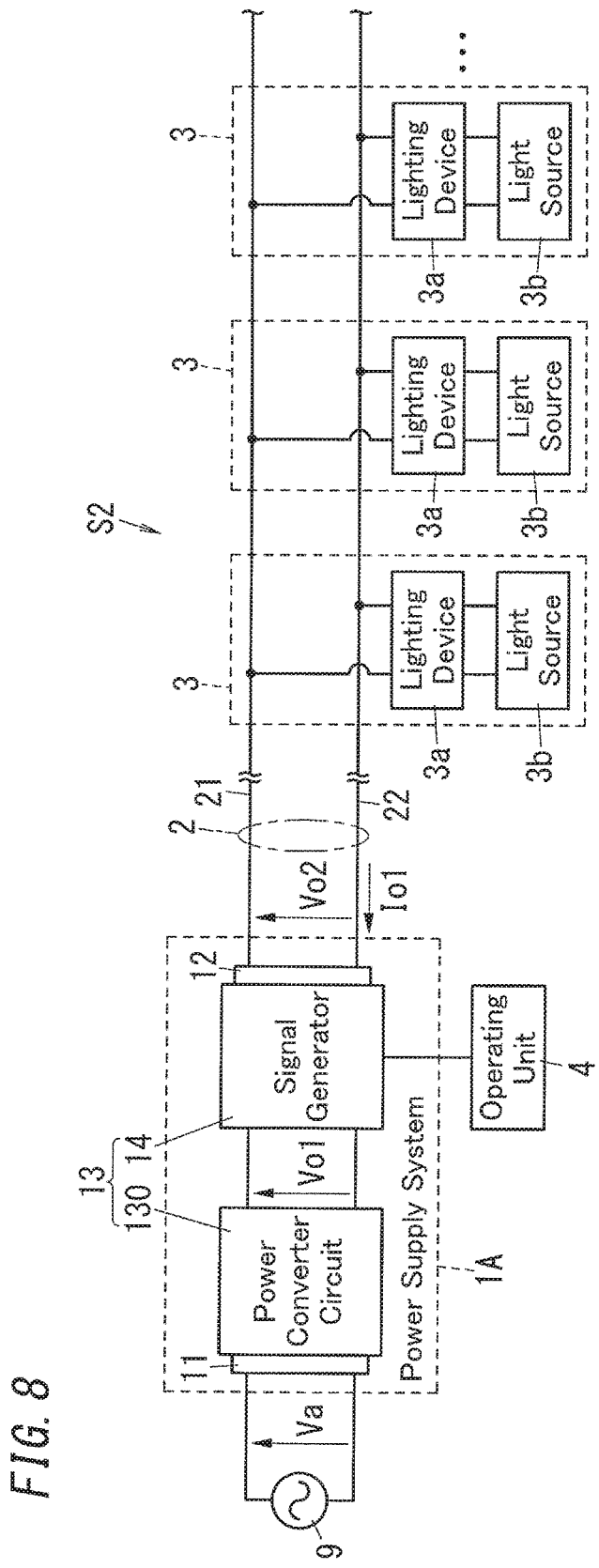
FIG. 8 is a block diagram illustrating an illumination system according to a second embodiment of the present disclosure.

An illumination system S2 according to a second embodiment includes a power supply system 1A, a power cable 2, light fixtures 3, and an operating unit 4 as shown in FIG. 8. In the following description, any constituent member of the second embodiment having the same function as the counterpart of the first embodiment described above will be designated by the same reference numeral as that counterpart's, and a detailed description thereof will be omitted herein. In the second embodiment, the power converter circuit 130 may be implemented as any one of the power converter circuit 13A, 13B, 13C, or 13D.

In the power supply system 1A, the power supply circuit 13 of the first embodiment further includes a signal generator 14. The signal generator 14 receives a pulsating voltage Vo1 (i.e., the voltage between the two terminals of the capacitor C1) as an input voltage and outputs a pulsating voltage Vo2. In the following description of the second embodiment, the pulsating voltage Vo1 will be hereinafter referred to as a "first pulsating voltage Vo1" and the pulsating voltage Vo2 will be hereinafter referred to as a "second pulsating voltage Vo2."

While generating a signal, the signal generator 14 generates the second pulsating voltage Vo2 by varying the waveform of the first pulsating voltage Vo1. The second pulsating voltage Vo2 is applied to the electric wires 21 and 22 through the output terminals 121 and 122 of the output unit 12. In other words, the signal generator 14 has the capability of transmitting a control signal through the pair of electric wires 21 and 22 by varying the waveform of the voltage between the pair of electric wires 21 and 22.

Figure 9:
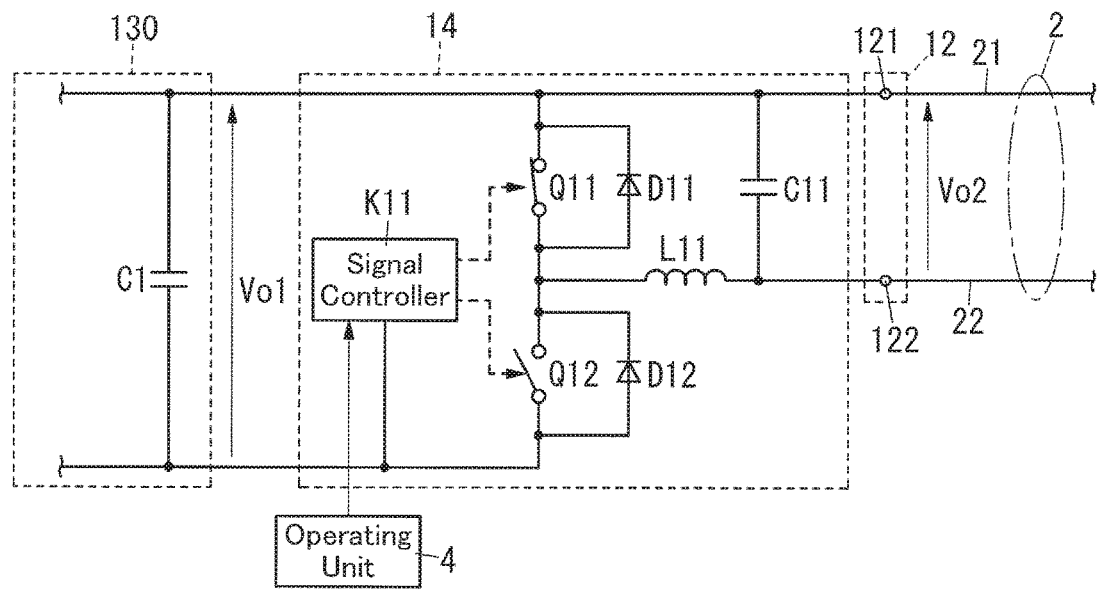
FIG. 9 is a circuit diagram illustrating a signal generator according to the second embodiment.

The signal generator 14 of this embodiment will be described. As shown in FIG. 9, the signal generator 14 includes a capacitor C11, a first switching element Q11, a second switching element Q12, an inductor L11, diodes D11 and D12, and a signal controller K11.

A series circuit of the first switching element Q11 and the second switching element Q12 is connected in parallel with the capacitor C1 of the power converter circuit 130. The first switching element Q11 is provided as a high-side switch and the second switching element Q12 is provided as a low-side switch. The diodes D11 and D12 are connected inverse-parallel with the first switching element Q11 and the second switching element Q12, respectively. Between the two terminals of the first switching element Q11, connected is a series circuit of the capacitor C11 and the inductor L11. That is to say, the path connected in parallel with the first switching element Q11 (hereinafter referred to as a "parallel path") is provided with the series circuit of the capacitor C11 and the inductor L11. The output terminals 121 and 122 are respectively connected to positive and negative electrodes of the capacitor C11.

Then, the signal controller K11 transmits a control signal to the pair of electric wires 21 and 22 by controlling the respective ON and OFF states of the first switching element Q11 and the second switching element Q12. If the first switching element Q11 is OFF and the second switching element Q12 is ON, then the capacitor C11 will be charged by the first pulsating voltage Vo1 (i.e., subjected to a charge operation) and the second pulsating voltage Vo2 will have the same waveform as the first pulsating voltage Vo1. On the other hand, if the first switching element Q11 is ON and the second switching element Q12 is OFF, then the capacitor C11 will be discharged (i.e., subjected to a discharge operation) and the second pulsating voltage Vo2 will have a waveform in which the full-wave rectified waveform of the first pulsating voltage Vo1 is indented with negative rectangular pulses. That is to say, the second pulsating voltage Vo2 will have a waveform obtained by superposing a signal on the first pulsating voltage Vo1.

The signal generator 14 is able to change the voltage of the capacitor C11 (i.e., the second pulsating voltage Vo2) quickly by switching the mode of operation to be performed on the capacitor C11 from the charge operation into the discharge operation, and vice versa, as described above.

Also, the rates of charging and discharging the capacitor C11 may be controlled by the inductor L11 serving as an impedance element. Optionally, the signal generator 14 may include a resistor or any other appropriate impedance element instead of the inductor L11.

The operating unit 4 is configured to readily transmit an instruction signal to the signal controller K11. In response to a command generated by the user's operation, the operating unit 4 outputs the instruction signal to the signal controller K11. In this embodiment, the instruction signal is an instruction signal instructing the light intensity level of the light fixtures 3 (i.e., an instruction signal for light intensity control). If the light intensity level has been updated in accordance with the user's operation, the operating unit 4 outputs an instruction signal instructing the updated light intensity level.

Figure 10:
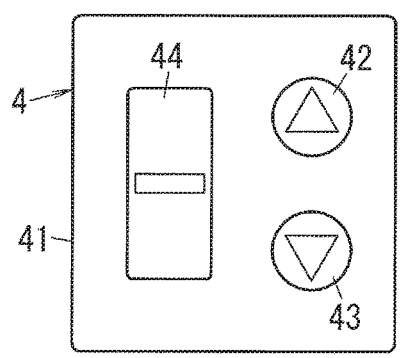
FIG. 10 is a front view illustrating an exemplary configuration of an operating unit according to the second embodiment.

FIG. 10 illustrates an exemplary configuration for the operating unit 4. The operating unit 4 includes a casing 41, and a level up button 42, a level down button 43, and a display 44, all of which are provided on the front surface of the casing 41. The level up button 42 is a button to be operated by the user when he or she wants to raise the light intensity level. The level down button 43 is a button to be operated by the user when he or she wants to lower the light intensity level. The display 44 includes a plurality of LEDs arranged vertically, and is configured to indicate the light intensity level selected by increasing the number of LEDs to light as the light intensity level selected goes up and by decreasing the number of LEDs to light as the light intensity level selected goes down.

The instruction signal to be output by the operating unit 4 does not have to be the instruction signal for light intensity control but may also be any other appropriate instruction signal such as an instruction signal instructing control of the light color. Also, the operating unit 4 does not have to have the configuration shown in FIG. 10, but just needs to be configured to output some instruction signal, indicating a light intensity level, a light color, a lit state, or an extinct state selected in accordance with the user's operation, to the signal controller K11. In that case, the signal controller K11 may generate a light intensity control signal, a light color control signal, a lighting control signal, an extinction control signal, or any other control signal. Note that the signal transmission line between the operating unit 4 and the signal controller K11 may be a wired one or a wireless one without particular limitation.

Figure 11:
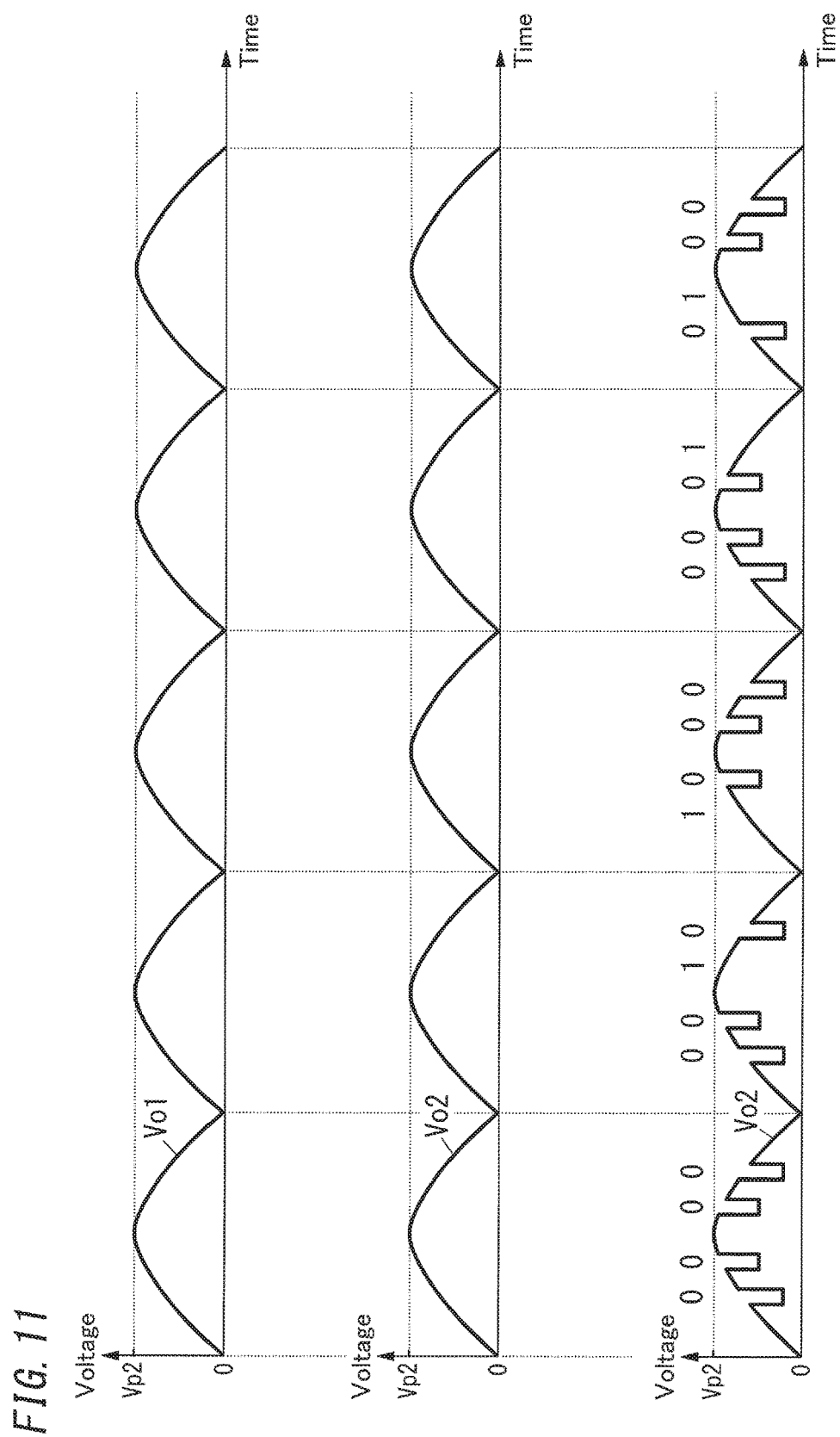
FIG. 11 illustrates the waveforms of a first pulsating voltage and a second pulsating voltage according to the second embodiment, wherein the top graph illustrates the waveform of a first pulsating voltage; the middle graph illustrates the waveform of a second pulsating voltage in a steady state; and the bottom graph illustrates the waveform of a second pulsating voltage while a signal is being generated.

In FIG. 11, the top graph illustrates the waveform of the first pulsating voltage Vo1; the middle graph illustrates the waveform of the second pulsating voltage Vo2 in a steady state where the signal controller K11 is generating no signals; and the bottom graph illustrates the waveform of the second pulsating voltage Vo2 in a state where the signal controller K11 is generating a signal.

In the steady state, no instruction signal for light intensity control is output from the operating unit 4, and therefore, the signal controller K11 keeps the first switching element Q11 and the second switching element Q12 OFF and ON, respectively. As a result, the first pulsating voltage Vo1 is continuously applied to the two terminals of the capacitor C11 and the second pulsating voltage Vo2 will have the same waveform as the first pulsating voltage Vo1 (see the top graph and the middle graph of FIG. 11).

In accordance with the instruction signal for light intensity control from the operating unit 4, the signal controller K11 switches the ON and OFF states of the first switching element Q11 and the second switching element Q12, thereby changing the mode of operation to be performed on the capacitor C11 from the charge operation into the discharge operation, and vice versa. That is to say, the signal controller K11 generates the second pulsating voltage Vo2, on which the light intensity control signal is superposed as a binary digital signal, by changing the mode of operation to be performed on the capacitor C11 from the charge operation into the discharge operation, and vice versa. In this embodiment, the state of the capacitor C11 being charged by the charge operation corresponds to a digital value of "1" and the state of the capacitor C11 being discharged by the discharge operation corresponds to a digital value of "0."

The signal generator 14 makes one period of the discharge operation shorter than one cycle (i.e., a half-wave period) of the full-wave rectified waveform of the first pulsating voltage Vo1, thereby turning the waveform of the second pulsating voltage Vo2 (i.e., the voltage of the capacitor C11) into a waveform in which the full-wave rectified waveform is indented with negative rectangular pulses (see the top graph and the bottom graph of FIG. 11).

As shown in the bottom graph of FIG. 11, the signal controller K11 transmits a four-bit digital signal within one cycle of the first pulsating voltage Vo1 synchronously with the phase of the first pulsating voltage Vo1 in order to transmit multi-bit digital signals along the time series. The signal controller K11 establishes synchronization with respect to a zero cross point of the first pulsating voltage Vo1 to transmit a two-bit digital signal during the first half of one cycle of the first pulsating voltage Vo1 and transmit another two-bit signal during the second half of one cycle of the first pulsating voltage Vo1. That is to say, there are four bit transmission periods during one cycle of the first pulsating voltage Vo1. Other than those bit transmission periods, the second pulsating voltage Vo2 has the same waveform as the first pulsating voltage Vo1 since the charge operation is being performed.

As can be seen, the four-bit digital signal transmitted during one cycle of the first pulsating voltage Vo1 has its transmission timings determined on a bit-by-bit basis within one cycle. This allows the signal generator 14 to transmit multi-bit digital signals within one cycle of the first pulsating voltage Vo1, thus improving the communication efficiency.

Also, the signal controller K11 suitably controls the first switching element Q11 and the second switching element Q12 such that the discharge operation will not be performed when the instantaneous value of the first pulsating voltage Vo1 is equal to or less than a threshold value. If the instantaneous value of the first pulsating voltage Vo1 is too low, then the difference between the value of the second pulsating voltage Vo2 during the discharge operation and that of the second pulsating voltage Vo2 during the charge operation will be too small for the light fixtures 3 to distinguish the digital values easily. Thus, preventing the signal generator 14 from performing the discharge operation when the instantaneous value of the first pulsating voltage Vo1 is equal to or less than the threshold value allows for reducing transmission errors of the control signals.

Furthermore, the signal controller K11 suitably generates the control signals using communication frames. Each communication frame includes identification information of the light fixture 3 as the destination, control data to be provided as instruction, and other pieces of information, thus allowing the light fixtures 3 to be subjected to individual control, group control, scene control, and other types of control. However, transmitting blocks of a single communication frame over multiple cycles of the first pulsating voltage Vo1 would often cause communication errors. Therefore, the signal controller K11 suitably transmits an integral number of communication frames within one cycle of the first pulsating voltage Vo1. This allows the signal generator 14 to transmit the control signals without dividing any communication frame into multiple blocks, thus improving the stability of communication. Also, the number of bits that can be transmitted in a single communication frame may be 10 to 14, for example. However, this number of bits is only an example and should not be construed as limiting.

Figure 12:
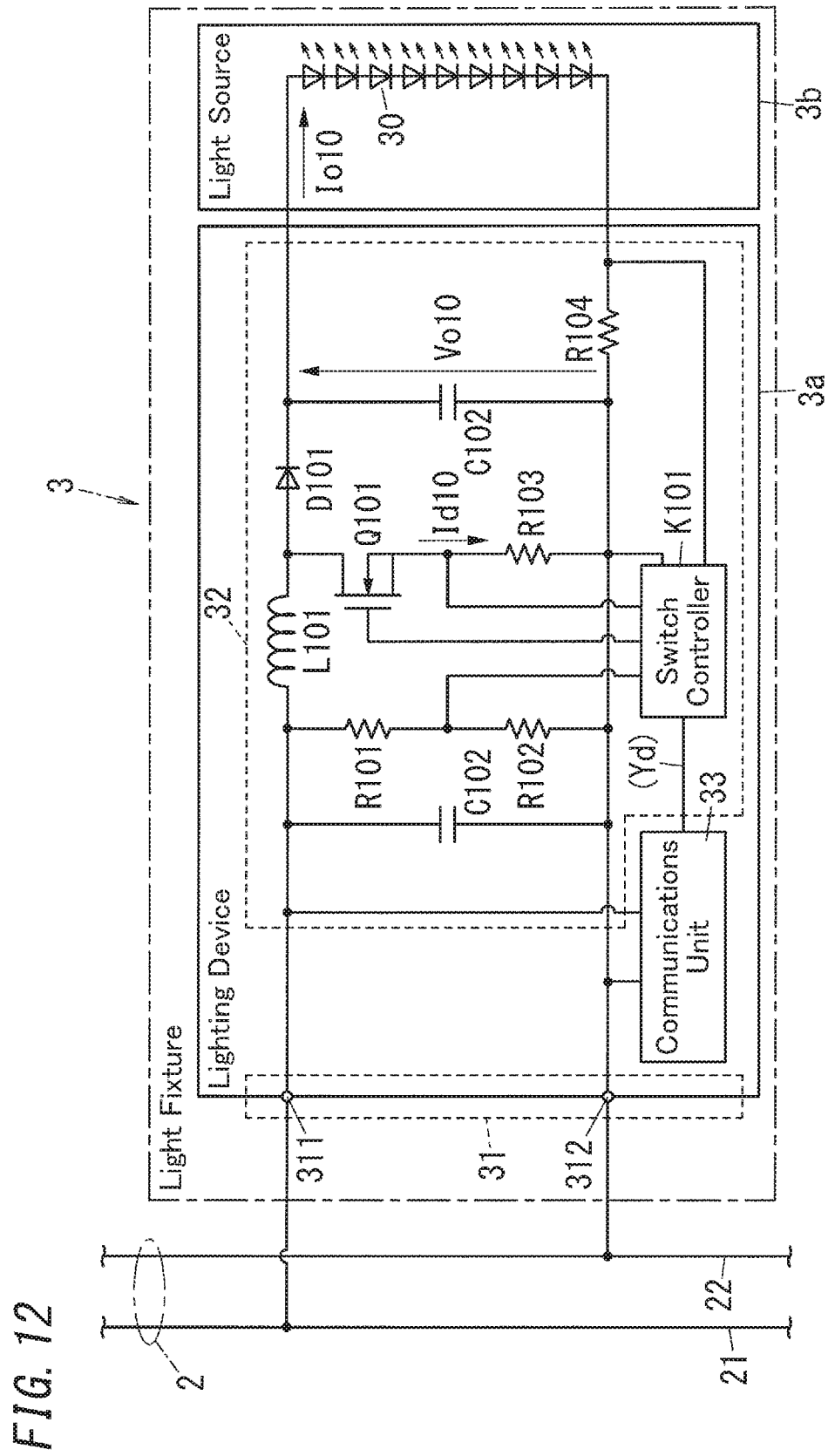
FIG. 12 is a circuit diagram illustrating a light fixture according to the second embodiment.

FIG. 12 illustrates a configuration for a light fixture 3 according to this embodiment.

The light fixture 3 further includes a communications unit 33. The communications unit 33 demodulates control signals from the second pulsating voltage Vo2 synchronously with the phase of the second pulsating voltage Vo2. Specifically, the communications unit 33 establishes synchronization with respect to a zero cross point of the second pulsating voltage Vo2 to demodulate a four-bit digital signal within one cycle of the second pulsating voltage Vo2.

For example, the communications unit 33 may set a read timing (or a read period) at a point in time when a predetermined amount of time has passed since a zero cross point of the second pulsating voltage Vo2. In that case, there are four read timings, which are as many as the number of bits per cycle. In addition, at each of those read timings, the communications unit 33 further detects the variation in the second pulsating voltage Vo2 at a predetermined point in time. In this embodiment, the communications unit 33 reads a digital value of "0" on finding that the second pulsating voltage Vo2 has decreased to a predetermined degree or more at a read timing, and reads a digital value of "1" on finding that the second pulsating voltage Vo2 has not decreased at the read timing.

Alternatively, the communications unit 33 may also compare the second pulsating voltage Vo2 with a predetermined signal threshold value at each of those read timings. In that case, the communications unit 33 reads a digital value of "0" on finding the second pulsating voltage Vo2 to be less than the signal threshold value at a read timing, and reads a digital value of "1" on finding the second pulsating voltage Vo2 to be equal to or greater than the signal threshold value at the read timing.

Then, the switch controller K101 of the lighting circuit 32 regulates the load current Io10 in accordance with the control signal (such as a light intensity control signal, a light color control signal, a lighting control signal, or an extinction control signal) that has been read by the communications unit 33, thereby controlling the state of the light source 3b.

As can be seen from the foregoing description, the lighting device 3a is able to receive both the load power and the control signal through the pair of electric wires 21 and 22. Thus, there is no need to provide any additional control signal transmission line for the power supply system 1A to transmit the control signal to the lighting device 3a. Besides, there is no need to provide any expensive wireless communications device as an additional component, either.

Furthermore, adjusting the waveform of the second pulsating voltage Vo2 by normal feedback control would make it difficult to change the waveform (i.e., change the voltage) steeply, especially when the load on the light fixtures 3 is light. For this reason, the signal generator 14 shapes the waveform of the second pulsating voltage Vo2 by performing the charge and discharge operations on the capacitor C11, thus achieving a steep waveform change more easily than in the case of the feedback control and maintaining a high communication rate even when the load on the light fixtures 3 is relatively light. In addition, depending on the communication protocol, multiple pieces of information may be transmitted in a short period of time as well.

Optionally, the signal generator 14 may be configured to superpose high-frequency control signals on the first pulsating voltage Vo1.

Third Embodiment

Figure 13:
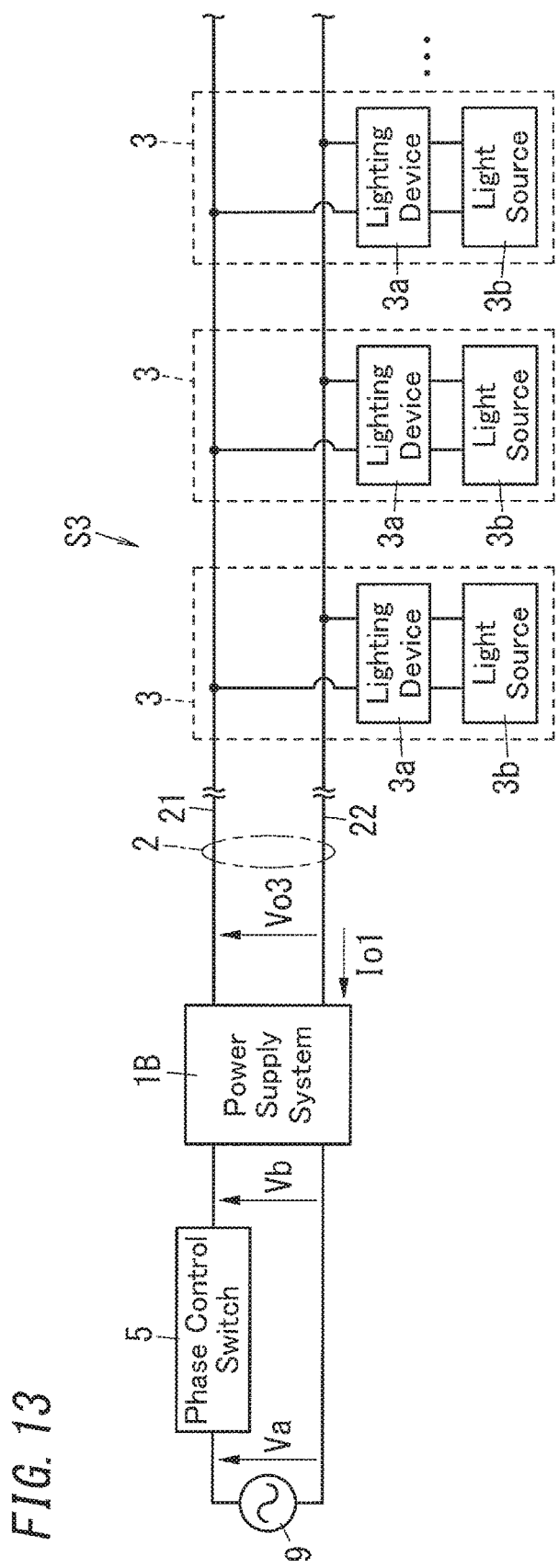
FIG. 13 is a block diagram illustrating an illumination system according to a third embodiment of the present disclosure.

An illumination system S3 according to a third embodiment includes a power supply system 1B, a power cable 2, light fixtures 3, and a phase control switch 5 as shown in FIG. 13. In the following description, any constituent member of this third embodiment having the same function as the counterpart of the first embodiment described above will be designated by the same reference numeral as that counterpart's, and a detailed description thereof will be omitted herein.

In this illumination system S3, a series circuit of the phase control switch 5 and the power supply system 1B is connected between the two terminals of the utility power supply 9.

The phase control switch 5 includes an operating unit and a semiconductor switching element. The user operates the operating unit to set the light intensity level of the light fixtures 3. The phase control switch 5 turns the semiconductor switching element ON and OFF according to the light intensity level that has been set. Then, the phase control switch 5 performs phase control by adjusting the conduction angle of the input voltage Va (i.e., the input conduction angle), thereby performing light intensity control on the light fixtures 3.

Next, it will be described how to perform the light intensity control using the phase control switch 5.

Figure 14:
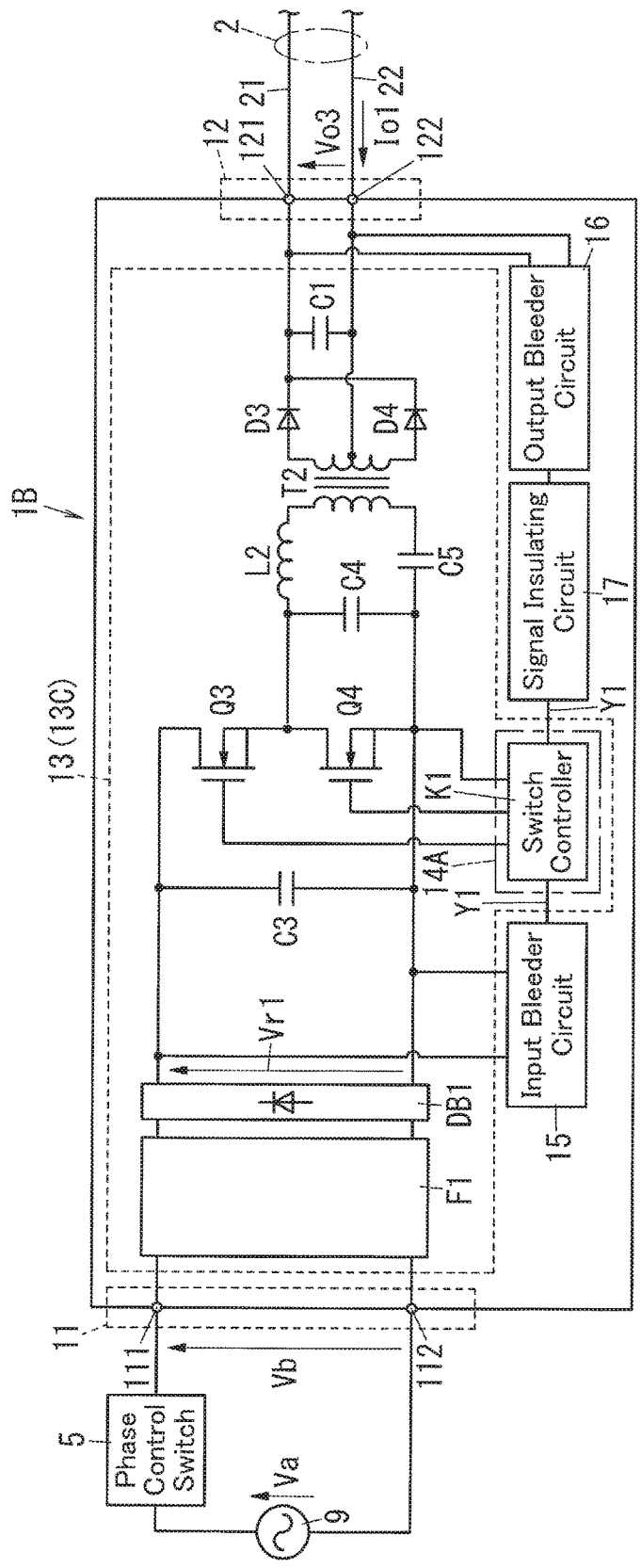
FIG. 14 is a circuit diagram illustrating a power supply system according to the third embodiment.

The power supply system 1B includes the input unit 11, the output unit 12, the power supply circuit 13, an input bleeder circuit 15, an output bleeder circuit 16, and a signal insulating circuit 17 as shown in FIG. 14. That is to say, the power supply system 1B includes not only all components of the power supply system 1 of the first embodiment but also the input bleeder circuit 15, the output bleeder circuit 16, and the signal insulating circuit 17 as additional components. Note that although the power supply circuit 13 includes power converter circuit 13C in the example illustrated in FIG. 14, the power supply circuit 13 may include any of the power converter circuit 13A, 13B, or 13D described above instead of the power converter circuit 13C.

Figure 15:
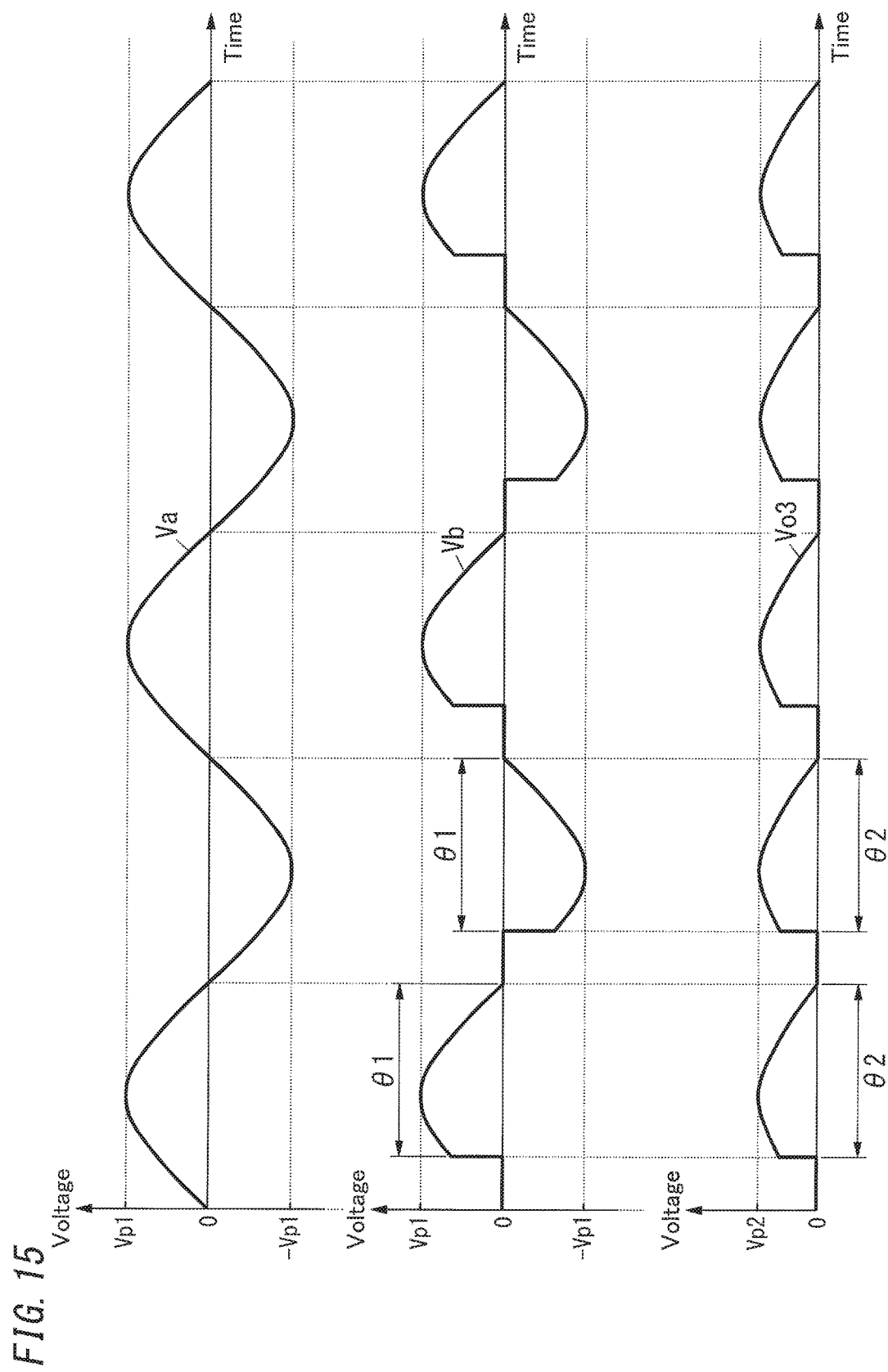
FIG. 15 illustrates the waveforms of input voltages and a pulsating voltage according to the third embodiment, wherein the top graph illustrates the waveform of an input voltage Va; the middle graph illustrates the waveform of an input voltage Vb; and the bottom graph illustrates the waveform of a pulsating voltage Vo3.

First of all, the input voltage Va has a sinusoidal waveform as shown in the top graph of FIG. 15. The phase control switch 5 includes a triac as a semiconductor switching element. When the triac is ON, the electric path between the utility power supply 9 and the power supply system 1B becomes electrically conductive. On the other hand, when the triac is OFF, the electric path between the utility power supply 9 and the power supply system 1B is cut off. That is to say, when the triac is ON, the input voltage Va is applied to the input unit 11 of the power supply system 1B and AC power is supplied from the utility power supply 9 to the power supply system 1B. On the other hand, when the triac is OFF, the input voltage Va is not applied to the input unit 11 of the power supply system 1B and no AC power is supplied from the utility power supply 9 to the power supply system 1B. Thus, the input voltage Vb applied to the input unit 11 comes to have a waveform in which the input voltage Va has been subjected to phase control so as to have an input conduction angle θ1 as shown in the middle graph of FIG. 15. Note that the higher the light intensity level is, the earlier the triac of the phase control switch 5 turns ON and the lower the light intensity level is, the later the triac of the phase control switch 5 turns ON. That is to say, the higher the light intensity level is, the larger the input conduction angle θ1 will be. In other words, the lower the light intensity level is, the smaller the input conduction angle θ1 will be.

The power supply system 1B receives the phase-controlled input voltage Vb and the rectifier DB1 outputs a rectified voltage obtained by full-wave rectifying the input voltage Vb. In addition, in the power supply system 1B, the switch controller's K1 switching control of the switching elements Q3 and Q4 allows a pulsating voltage Vo3 to be generated between two terminals of the capacitor C1 by stepping down the rectified voltage and to be output through the output unit 12. The pulsating voltage Vo3 comes to have a waveform that has been phase-controlled in the same way as the input voltage Vb as shown in the bottom graph of FIG. 15. The output conduction angle θ2, representing a period during which the pulsating voltage Vo3 is applied between the pair of electric wires 21 and 22, becomes as large as the input conduction angle θ1. Then, the pulsating voltage Vo3 that has been phase-controlled in the same way as the input voltage Vb is applied between the pair of electric wires 21 and 22, and is input to the light fixtures 3.

That is to say, it can be said that the power supply system 1B transmits a light-intensity control signal in the form of the phase-controlled pulsating voltage Vo3. In this case, the switch controller K1 generates the pulsating voltage Vo3 that has been phase-controlled in the same way as the input voltage Vb by acquiring voltage data of the input voltage Vb as input voltage data. The switch controller K1 functions as the signal generator 14A. The switch controller K1 may use, as the input voltage data of the input voltage Vb, the cathode voltage of the diodes D21 and D22 of the input bleeder circuit 15 as will be described later.

As in the second embodiment described above, the light fixtures 3 according to this embodiment also each include the communications unit 33 (see FIG. 12). The communications unit 33 of this embodiment detects an output conduction angle θ2 by comparing the pulsating voltage Vo3 with a conduction threshold value, and then outputs a duty signal Yd, of which the duty ratio has been set so as to correspond to the output conduction angle θ2 thus detected, for example, to the switch controller K101. That is to say, the duty ratio of the duty signal Yd corresponds to the output conduction angle θ2. The switch controller K101 stores in advance the correspondence between the duty ratio of the duty signal Yd and the target value of the load current Io10, and determines the target value of the load current Io10 corresponding to the duty ratio. Then, the switch controller K101 performs switching control on the switching element Q101 so that the load current Io10 agrees with the target value. That is to say, the lighting device 3a reads the light intensity control signal by detecting the output conduction angle θ2 and performs light intensity control on the light source 3b such that the light intensity level corresponds to the output conduction angle θ2.

In this manner, the phase control switch 5 generates the phase-controlled input voltage Vb, and the power supply system 1B applies the pulsating voltage Vo3 that has been phase-controlled in the same way between the pair of electric wires 21 and 22. Each of the light fixtures 3 controls the light intensity of the light source 3b so that the light intensity level corresponds to the output conduction angle θ2 of the input pulsating voltage Vo3.

In this embodiment, the phase control switch's 5 triac is a leading-edge type semiconductor switching element with a self-holding function. The triac turns ON and becomes electrically conductive on a leading edge of a trigger signal input to its gate. The phase angle at which the trigger signal rises (i.e., the phase angle corresponding to the leading edge of the trigger signal) varies according to the light intensity level set by the user. Thereafter, just before a zero cross point of the input voltage Va, the trigger signal is made to fall to avoid a breakthrough (i.e., to avoid keeping the triac ON unintentionally) in the next period. Once the trigger signal has fallen, no drive current flows through the gate of the triac any longer. The triac keeps electrically conductive as long as the amount of the anode current is larger than that of the holding current. That is why even after the trigger signal has fallen, AC power is continuously supplied for a while from the utility power supply 9 to the power supply system 1B. After that, when the amount of the anode current of the triac becomes less than that of the holding current, the triac turns OFF, and becomes electrically non-conductive (i.e., cut off). This stops the supply of the AC power from the utility power supply 9 to the power supply system 1B.

Also, in the vicinity of the zero cross point at which the input voltage Va becomes close to 0 V, the amount of the anode current becomes low enough to possibly turn the triac OFF earlier than usual due to noise, for example. This causes a variation in the input conduction angle θ1, resulting in a variation in the output conduction angle θ2 as well. This could make the light fixtures 3 flickering or suddenly extinct. On top of that, in the vicinity of the zero cross point of the input voltage Va, it is difficult to secure control power supply for the phase control switch 5.

Thus, to overcome such a problem, in the vicinity of the zero cross point of the input voltage Va, the input bleeder circuit 15 allows an input bleeder current Ib to flow through the triac of the phase control switch 5, thus stabilizing the input conduction angle θ1 and securing a control power supply for the phase control switch 5.

Figure 16:
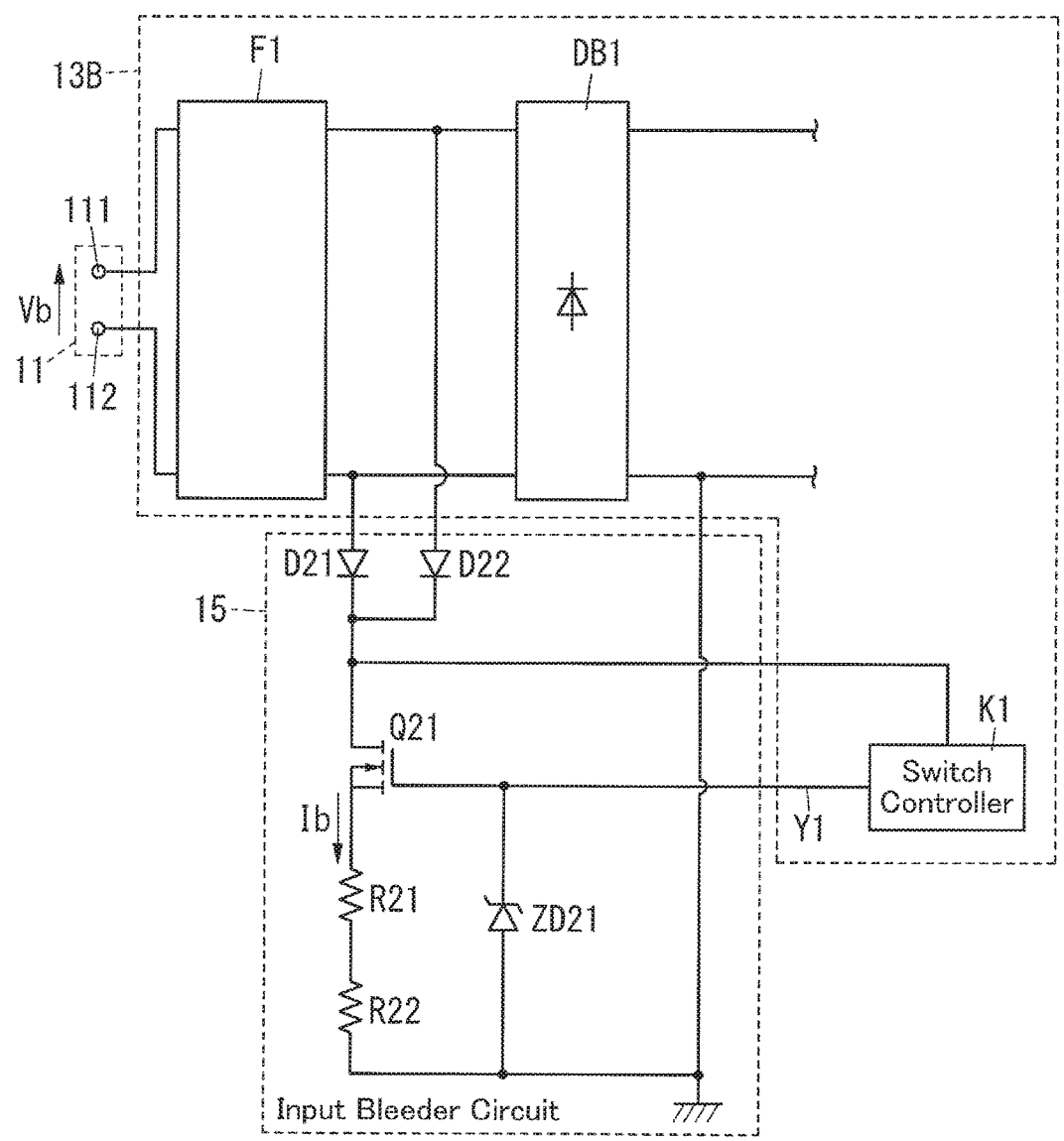
FIG. 16 is a circuit diagram illustrating an input bleeder circuit according to the third embodiment.

FIG. 16 illustrates a configuration for the input bleeder circuit 15. The input bleeder circuit 15 includes diodes D21 and D22, a switching element Q21, resistors R21 and R22, and a Zener diode ZD21.

The diodes D21 and D22 have their respective anodes connected to associated input terminals of the rectifier DB1. Also, a series circuit of the switching element Q21 and the resistors R21 and R22 is connected between the respective cathodes of the diodes D21 and D22 and a low-voltage rectified output of the rectifier DB1. The switching element Q21 has its drain connected to the respective cathodes of the diodes D21 and D22, its source connected to the series circuit of the resistors R21 and R22, and its gate connected to the switch controller K1. Furthermore, the Zener diode D21 is connected between the gate of the switching element Q21 and the low-voltage rectified output of the rectifier DB1.

The diodes D21 and D22 detect the input conduction angle θ1 of the input voltage Vb. Specifically, a voltage waveform, obtained by full-wave rectifying the input voltage Vb, has been produced at the respective cathodes of the diodes D21 and D22. The switch controller K1 generates a bleeder control signal Y1 by comparing this voltage waveform with a first threshold value. The bleeder control signal Y1 has an L level when the instantaneous value of the input voltage Vb is equal to or greater than first threshold value, and has an H level when the instantaneous value of the input voltage Vb is less than the first threshold value. The switch controller K1 applies this bleeder control signal Y1 to the gate of the switching element Q21.

The switching element Q21 turns ON when the bleeder control signal Y1 has the H level, i.e., when the instantaneous value of the input voltage Vb is less than the threshold value (first threshold value). As a result, the impedance of the input bleeder circuit 15 connected between the input terminals 111 and 112 becomes relatively low, and an input bleeder current Ib flows through the diode D21 or D22, the switching element Q21, and the resistors R21 and R22 between the input terminals 111 and 112. This input bleeder current Ib is supplied from the utility power supply 9 as a current source to flow through a closed circuit made up of the utility power supply 9, the phase control switch 5, and the input bleeder circuit 15.

On the other hand, the switching element Q21 turns OFF when the bleeder control signal Y1 has the L level, i.e., when the instantaneous value of the input voltage Vb is equal to or greater than the threshold value. As a result, the impedance of the input bleeder circuit 15 connected between the input terminals 111 and 112 becomes relatively high, and an input bleeder current Ib goes zero.

As can be seen from the foregoing description, the input bleeder circuit 15 allows the input bleeder current Ib to flow in the vicinity of the zero cross point of the input voltage Va by adjusting the impedance between the input terminals 111 and 112, thereby stabilizing the input conduction angle θ1 and securing a control power supply for the phase control switch 5.

In addition, according to this embodiment, providing the power supply system 1B with the input bleeder circuit 15 allows for cutting down the power loss, compared to providing the bleeder circuit for each of the plurality of light fixtures 3.

Furthermore, according to this embodiment, the lighting circuit 32 controls the load current Io10 to be supplied to the light source 3b such that the light intensity level corresponds to the output conduction angle θ2 of the pulsating voltage Vo3. However, the closer to the lower limit of dimming the light intensity level becomes, the more distorted the waveform of the pulsating voltage Vo3 becomes due to the input capacitance (such as the capacitor C101) of the lighting circuit 32 and the more likely the communications unit 33 of the lighting device 3a fails to detect the output conduction angle θ2 accurately.

Figure 17:
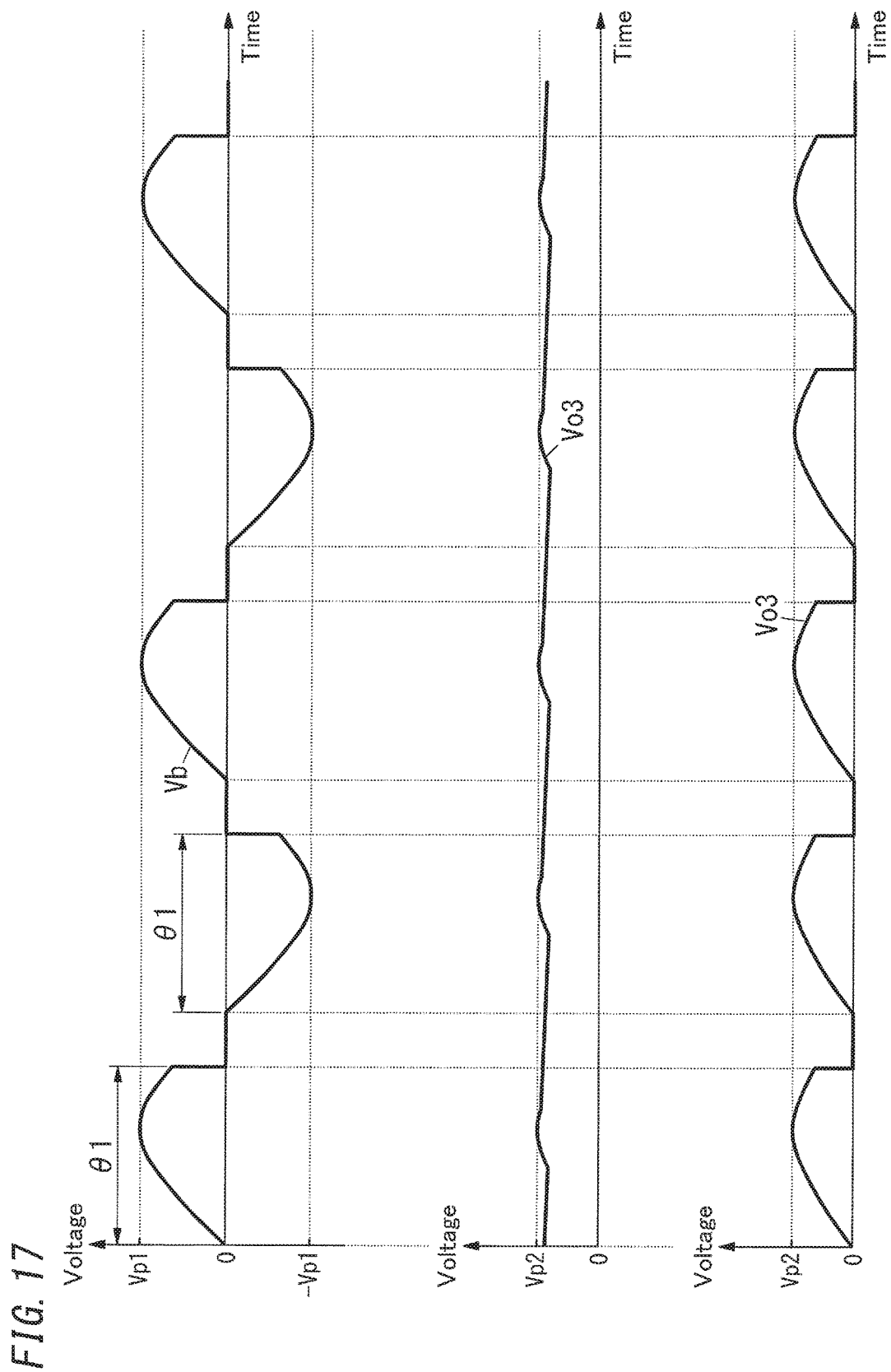
FIG. 17 illustrates the waveforms of an input voltage and pulsating voltages according to the third embodiment, wherein the top graph illustrates the waveform of an input voltage Vb; the middle graph illustrates the waveform of a pulsating voltage Vo3; and the bottom graph illustrates the waveform of a pulsating voltage Vo3 at the lower limit of dimming.

For example, if the phase control switch's 5 semiconductor switch is a trailing edge type semiconductor switch, then the input voltage Vb comes to have a waveform that has been phase-controlled to have an input conduction angle θ1 as shown in the top graph of FIG. 17.

Meanwhile, the middle graph of FIG. 17 illustrates the waveform of the pulsating voltage Vo3 with such distortion. The input capacitors of a plurality of lighting circuits 32 are connected in parallel with each other between the pair of electric wires 21 and 22. On the other hand, the closer to the lower limit of dimming the light intensity level is, the smaller the quantity of electric charges stored in the input capacitors and consumed becomes. Then, charging by the next half-wave of the pulsating voltage Vo3 will start before the voltage of the input capacitor falls fully. In that case, the communications unit 33 of the lighting device 3a is unable to accurately detect the output conduction angle θ2 and inconvenience could be caused in the control of the light source 3b.

For that reason, the power supply system 1B includes the output bleeder circuit 16 and the signal insulating circuit 17 as shown in FIG. 14. The switch controller K1 outputs the bleeder control signal Y1 to the output bleeder circuit 16 via the signal insulating circuit 17. The signal insulating circuit 17 may be implemented as a photocoupler, for example. The output bleeder circuit 16 is connected between the output terminals 121 and 122.

When the bleeder control signal Y1 has the H-level (i.e., when the instantaneous value of the input voltage Vb is less than the threshold value (i.e., the second threshold value)), the output bleeder circuit 16 turns the semiconductor switching element ON, thus decreasing the impedance of the output bleeder circuit 16 connected between the output terminals 121 and 122. As a result, an output bleeder current Ic flows between the output terminals 121 and 122, thus discharging the respective input capacitors of the plurality of lighting circuits 32.

On the other hand, when the bleeder control signal Y1 has the L-level (i.e., when the instantaneous value of the input voltage Vb is less than the threshold value), the output bleeder circuit 16 turns the semiconductor switching element OFF, thus increasing the impedance of the output bleeder circuit 16 connected between the output terminals 121 and 122. As a result, the output bleeder current Ic goes zero between the output terminals 121 and 122.

As can be seen from the foregoing description, the output bleeder circuit 16 adjusts the impedance between the output terminals 121 and 122 to allow the output bleeder current Ic to flow in the vicinity of the zero cross point of the input voltage Va and thereby discharge the respective input capacitors of the plurality of lighting circuits 32. Thus, as shown in the bottom graph of FIG. 17, even when the light intensity level comes close to the lower limit of dimming, the waveform of the pulsating voltage Vo3 is much less likely to be distorted and the accuracy of communications unit's 33 detecting the output conduction angle θ2 improves.

First Variation of Third Embodiment

Figure 18:
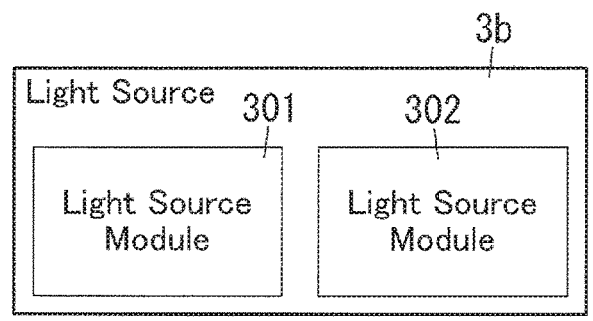
FIG. 18 is a block diagram illustrating a light source according to a first variation of the third embodiment.

In a first variation of the third embodiment, the light source 3b includes two types of light source modules 301 and 302, which emit light rays with mutually different color temperatures, as shown in FIG. 18. Then, a mixture of a light ray with a relatively low color temperature, emitted from a warm-colored light source module 301, and a light ray with a relatively high color temperature, emitted from a cold-colored light source module 302, emerges as light in mixed colors (hereinafter referred to as "mixed color light"). These light source modules 301 and 302 include solid-state light-emitting elements emitting light rays in mutually different colors. Alternatively, light sources with mutually different color temperatures may also be provided by superposing a fluorescent substance on solid-state light-emitting elements that emit light rays in the same color.

Figure 19:
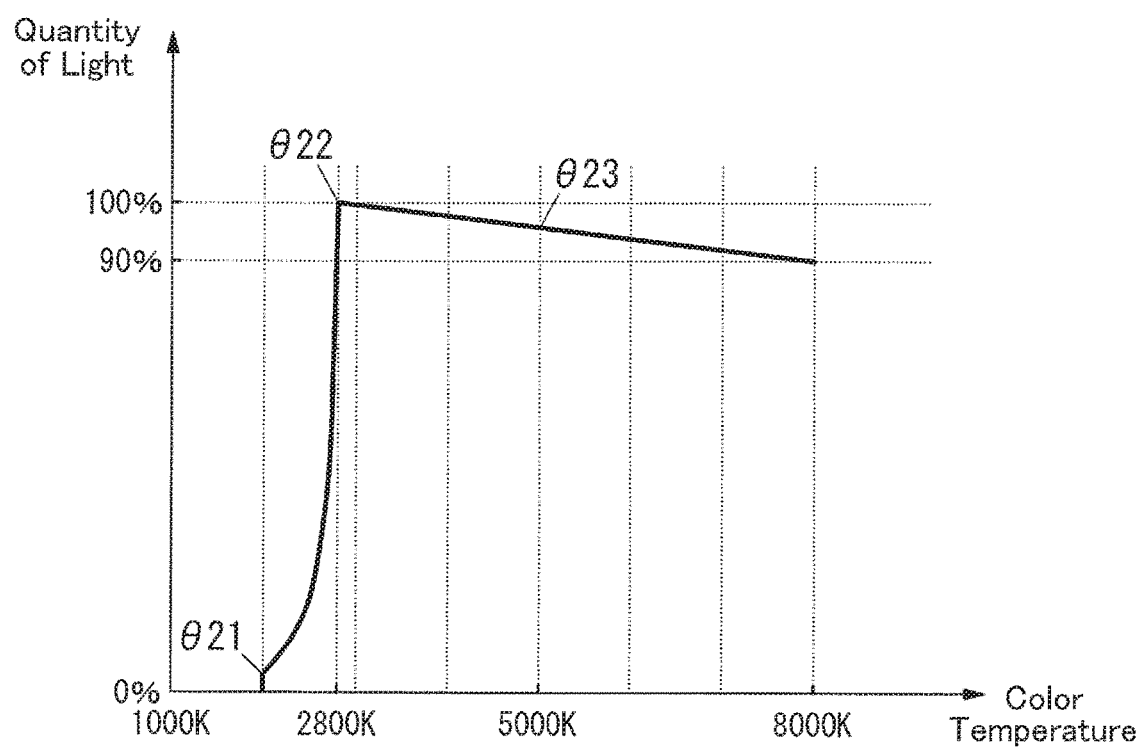
FIG. 19 illustrates the light intensity and light color control characteristics of a lighting device according to the first variation of the third embodiment.

The lighting device 3a changes the light intensity and color temperature of the mixed color light according to the output conduction angle θ2, and controls the light intensity and the light color in accordance with the light intensity/color control curve shown in FIG. 19. If the output conduction angle θ2 is equal to the lower limit value θ21, the light intensity level of the light source modules 301 and 302 becomes equal to the lower limit of dimming. Optionally, when the output conduction angle θ2 is equal to the lower limit value θ21, the light source modules 301 and 302 may be extinct. While the output conduction angle θ2 falls within the range from the lower limit value θ21 to θ22, the light intensity and the light color are controlled according to an increase or decrease in the output conduction angle θ2. When the output conduction angle θ2 becomes equal to θ22, the mixed color light comes to have a color temperature of 2800 K (i.e., becomes light in an incandescent color). When the output conduction angle θ2 becomes equal to an upper limit value θ23, the mixed color light comes to have a color temperature of 5000 K (i.e., becomes light in a natural white color).

Next, it will be described how the lighting device 3a controls the light intensity and light color of the light source modules 301 and 302. In general, when a given space is illuminated in changing colors, an incandescent color and a natural white color are recommended as the colors of light to illuminate the given space entirely. No matter whether the space is illuminated with light in the incandescent color or light in the natural white color, a predetermined optical output power is required to illuminate the space with sufficient brightness. When illuminated with light in the incandescent color, the space will look somewhat darker than when illuminated with light in the natural white color. That is why if approximately the same degree of brightness should be achieved no matter whether the space is illuminated with light in the incandescent color or light in the natural white color, a larger amount of current needs to be supplied when the space is illuminated with light in the incandescent color than when the space is illuminated with light in the natural white color. Also, while the light intensity level is decreased to the lower limit of dimming, the illumination is suitably dimmed in the incandescent color. The JIS Z 9112 standard entitled "Classification of fluorescent lamps and light emitting diodes by chromaticity and color rendering property," which is one of the Japanese Industrial Standards (JIS), defines, on an xy chromaticity diagram, the chromaticity ranges of the incandescent and natural white colors, which are light source colors of LEDs. The incandescent color has a correlated color temperature in the range from 2600 K to 3250 K and the natural white color has a correlated color temperature in the range from 4600 K to 5500 K. According to this embodiment, the light emitted from the light source module 301 has a color temperature lower than that of the incandescent color, and the light emitted from the light source module 302 has a color temperature higher than that of the natural white color, and an emission in the incandescent color or the natural white color is obtained by adjusting the ratio of these two colors mixed.

Figure 20:
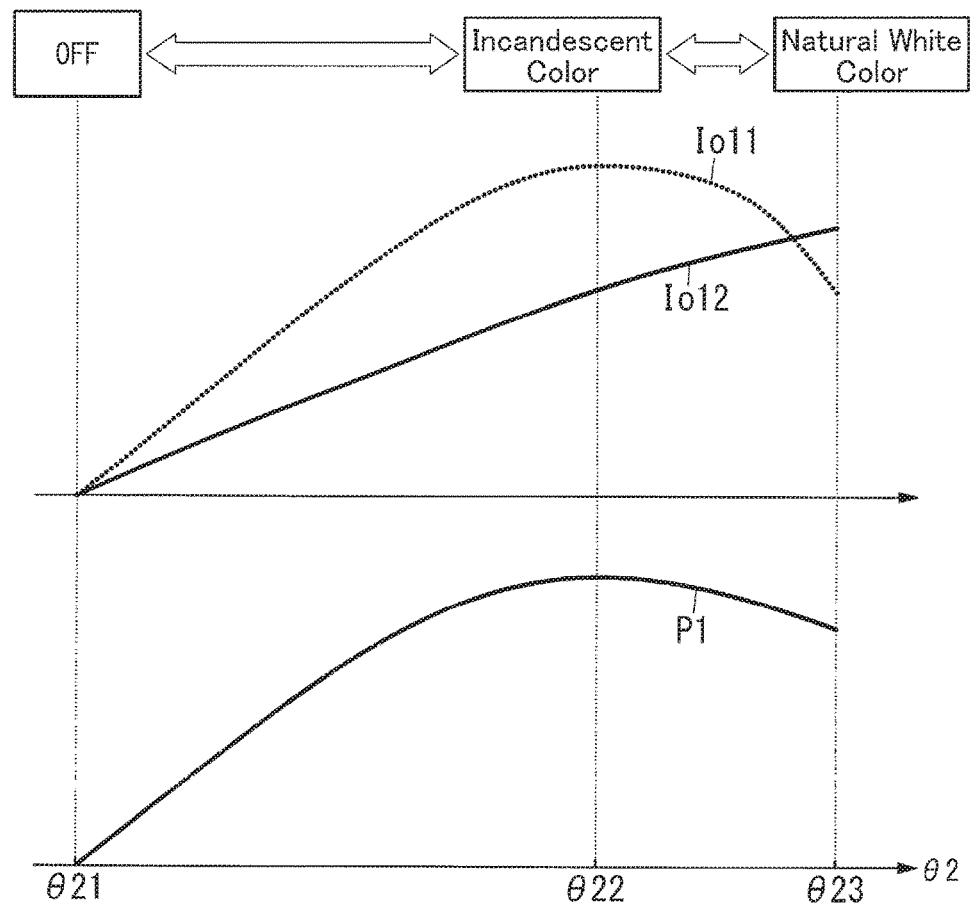
FIG. 20 is a waveform diagram illustrating how the lighting device operates while changing its light colors in the first variation of the third embodiment.

FIG. 20 is a graph showing how the load current Io11 to flow through the light source module 301 and the load current Io12 to flow through the light source module 302 change with the output conduction angle θ2 and how the total value P1 of the load power to be supplied to the light source modules 301 and 302 changes with the output conduction angle θ2.

When the output conduction angle θ2 becomes equal to the upper limit value θ23, the lighting device 3a of this variation turns the illuminating light (i.e., the mixture of the outputs of the light source modules 301 and 302) into light in the natural white color, and dims the illumination in the incandescent color from a middle through the lower limit of the range in which the output conduction angle θ2 is adjustable.

The lighting device 3a controls the load currents Io11 and Io12 such that the total value P1 of the load power reaches a local maximum in the middle of the range in which the output conduction angle θ2 is adjustable, and lights the illumination in the incandescent color when the total value P1 of the load power reaches the local maximum. The lighting device 3a controls the light color by adjusting the ratio of the amount of current flowing through the warm-colored light source module 301 to the amount of current flowing through the cold-colored light source module 302 (i.e., by adjusting their current ratio). Also, to achieve approximately the same degree of brightness no matter whether the space is illuminated with light in the incandescent color or light in the natural white color, a larger amount of current is supplied when the space is illuminated with light in the incandescent color than when illuminated with light in the natural white color.

Thus, to increase the quantity of light from the lower limit value θ21 toward the upper limit value θ23 of the range in which the output conduction angle θ2 is adjustable, the lighting device 3a monotonically increases the amount of the load current Io12 flowing through the cold-colored light source module 302. The lighting device 3a also regulates the amount of the load current Io11 flowing through the warm-colored light source module 301 such that the amount of the load current Io11 gradually increases from the lower limit value θ21 of the range in which the output conduction angle θ2 is adjustable to reach a local maximum value at the output conduction angle θ22 at which the total value P1 of the load power reaches a local maximum value.

Figure 21:
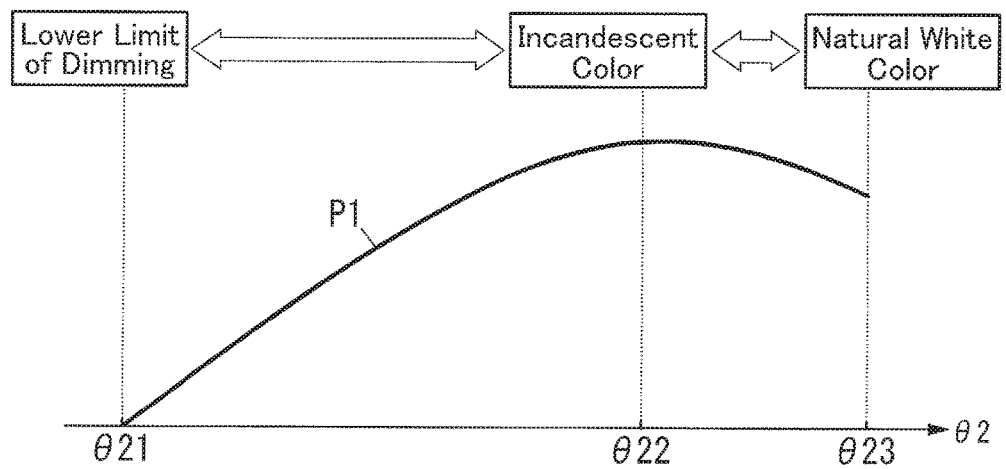
FIG. 21 is a waveform diagram illustrating how the lighting device operates while changing its light colors in the first variation of the third embodiment.

Then, as shown in FIG. 21, when the output conduction angle θ2 is equal to the lower limit value θ21, the lighting device 3a either lights the light source modules 301 and 302 at the lower limit of dimming or extinguishes those light source modules 301 and 302. The lighting device 3a controls the light color and light intensity with the total value P1 of the load power allowed to increase as the output conduction angle θ2 increases from the lower limit value θ21. When the output conduction angle θ2 reaches θ22, the lighting device 3a changes the light color of the illuminating light into the incandescent color, when the total value P1 of the load power becomes maximum. Thereafter, as the output conduction angle θ2 increases from θ22 to the upper limit value θ23, the total value P1 of the load power decreases from the maximum value. When the output conduction angle θ2 becomes equal to the upper limit value θ23, the light color of the illuminating light is changed into the natural white color.

The lighting device 3a according to this variation changes the color temperature of the illuminating light that is the mixture of the output light rays of the light source modules 301 and 302 within the range from the incandescent color to the natural white color. Alternatively, the lighting device 3a may change the color temperature within a range from the incandescent color to the daylight color with a higher color temperature than the natural white color. The JIS Z 9112 standard entitled "Classification of fluorescent lamps and light emitting diodes by chromaticity and color rendering property" defines, on an xy chromaticity diagram, the chromaticity range of the daylight color. According to this standard, the daylight color has a correlated color temperature within the range from 5700 K to 7100 K.

Figure 22:
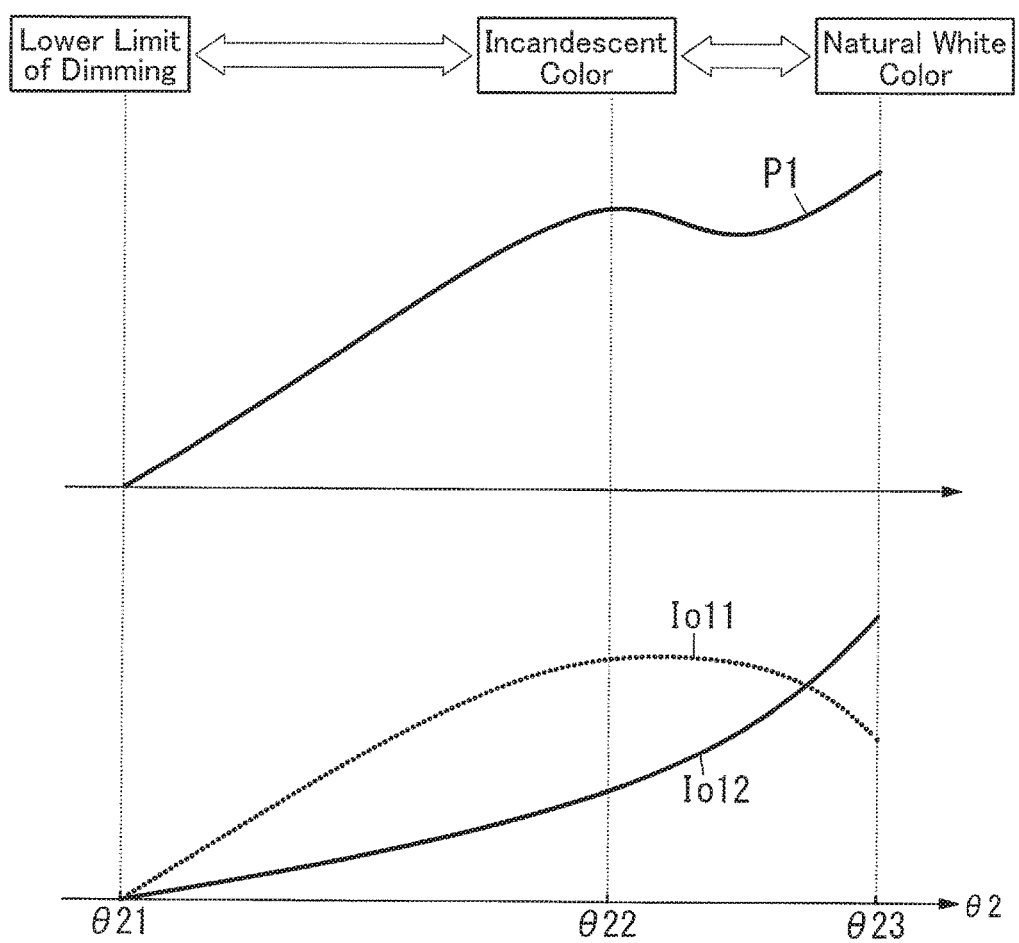
FIG. 22 is a waveform diagram illustrating how the lighting device operates while changing its light colors in the first variation of the third embodiment.

Then, as shown in FIG. 22, when the output conduction angle θ2 is equal to the lower limit value θ21, the lighting device 3a either lights the light source modules 301 and 302 at the lower limit of dimming or extinguishes those light source modules 301 and 302. The lighting device 3a controls the light color and light intensity with the total value P1 of the load power allowed to increase as the output conduction angle θ2 increases from the lower limit value θ21. When the output conduction angle θ2 reaches θ22, the lighting device 3a changes the light color of the illuminating light into the incandescent color, when the total value P1 of the load power reaches a local maximum value. Furthermore, the curve representing the variation in the total value P1 of the load power has a deflection point when the output conduction angle θ2 falls within the range from θ22 to the upper limit value θ23. Thus, while the output conduction angle θ2 changes from the deflection point to the upper limit value θ23, the total value P1 of the load power increases as the output conduction angle θ2 increases. When the output conduction angle θ2 becomes equal to the upper limit value θ23, the mixed color light comes to have a color temperature of 6200 K, and light in the daylight color is output.

Therefore, the total value P1 of the load power varies as represented by the curve shown in FIG. 22. The total value P1 of the load power comes to have such a characteristic as having a first deflection point when the output conduction angle θ2 is equal to θ22 (i.e., at a color temperature of 2800 K) and a second deflection point when the output conduction angle θ2 corresponds to a color temperature of 5000 K.

As can be seen from the foregoing description, the lighting device 3a controls the load power such that the output curve representing the total value P1 of the load power has either a maximum value or a deflection point within the range in which the output conduction angle θ2 is adjustable. Thus, adjusting the output conduction angle θ2 allows for switching the state from the lower limit of dimming into the state where the illumination is lit in the incandescent color and then into the state where the illumination is lit in either the natural white color or the daylight color. Consequently, the light intensity and light color of the light source modules 301 and 302 are controllable just by changing the output conduction angle θ2 (or the input conduction angle θ1).

Second Variation of Third Embodiment

Optionally, the phase control switch's 5 setting the input conduction angle θ1 at either 0 degrees or 180 degrees every half-wave period of the input voltage Va allows the power supply system 1B to generate a pulsating voltage Vo3 on which a pseudo-binary digital signal is superposed. In that case, the communications unit 33 may determine, by comparing the pulsating voltage Vo3 with a conduction threshold value, whether the output conduction angle θ2 is 0 degrees or 180 degrees.

As described above, the lighting device 3a is allowed to receive both the load power and the control signal through the pair of electric wires 21 and 22. Thus, there is no need to newly provide a control signal transmission line in order to transmit the control signal to the lighting device 3a, or to provide an expensive radio frequency communications device as an additional element, for the power supply system 1B.

In the embodiments and their variations described above, the switch controller K1 or K101 may include a computer system. In that case, the computer system may include, as principal hardware components, a processor and a memory. The function of the switch controller K1 or K101 according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). Those electronic circuits may be integrated together on a single chip or distributed on multiple chips without limitation. Those multiple chips may be integrated together in a single device or distributed in multiple devices without limitation.

Also, the switch controller K1 or K101 does not have to be a computer system but may also be, for example, an application specific integrated circuit (ASIC), a field programmable gate array (FPGA), or a controller integrated circuit (IC), to name just a few.

Each of the solid-state light-emitting elements that the light source 3b has does not have to be the LED 30 but may also be an organic electroluminescence (OEL), inorganic electroluminescence (EL), or any other type of solid-state light-emitting element. The number of solid-state light-emitting elements provided does not have to be plural but may also be singular. The solid-state light-emitting elements are electrically connected together in series in the embodiment described above. However, this is only an example and should not be construed as limiting. Alternatively, those solid-state light-emitting elements may also be electrically connected together in parallel or in series-parallel combination as well.

As can be seen from the foregoing description, a power supply system 1, 1A, or 1B according to a first aspect of the exemplary embodiment described above is configured to output a DC pulsating voltage Vo1, Vo2, or Vo3 to a pair of electric wires 21 and 22 through which load power is supplied to a light source 3b. The power supply system 1, 1A, or 1B includes a power supply circuit 13 and an output unit 12. The power supply circuit 13 generates the pulsating voltage Vo1, Vo2, or Vo3. The output unit 12 is to be connected to the pair of electric wires 21 and 22 to apply the pulsating voltage Vo1, Vo2, or Vo3 to the pair of electric wires 21 and 22. The power supply circuit 13 generates the pulsating voltage Vo1, Vo2, or Vo3 such that the pulsating voltage Vo1, Vo2, or Vo3 has a full-wave rectified waveform obtained by full-wave rectifying an alternating voltage as a wave alternating between a positive voltage and a negative voltage.

Thus, the power supply system 1, 1A, or 1B applies the pulsating voltage Vo1, Vo2, or Vo3 with the full-wave rectified waveform to the pair of electric wires 21 and 22. The pulsating voltage Vo1, Vo2, or Vo3 with the full-wave rectified waveform periodically decreases to either 0 V or a low voltage close to 0 V. Therefore, even if arc discharge is generated at a node to which the electric wire 21 or 22 is connected (e.g., in the output unit 12) or at a node at which the electric wire 21 or 22 is disconnected, the chances of arc extinction will increase, and the chances of arc discharge continuing will decrease, when there is a periodic decrease in the pulsating voltage Vo1, Vo2, or Vo3.

A power supply system 1, 1A, or 1B according to a second aspect of the exemplary embodiment described above, which may be implemented in conjunction with the first aspect, may further include an input unit 11 configured to receive an AC input voltage as an input voltage Va or Vb. The power supply circuit 13 may generate the pulsating voltage Vo1, Vo2, or Vo3 based on the input voltage Va or Vb.

This allows the power supply system 1, 1A, or 1B to generate the pulsating voltage Vo1, Vo2, or Vo3 based on the power supplied from the utility power supply 9, for example.

In a power supply system 1, 1A, or 1B according to a third aspect of the exemplary embodiment described above, which may be implemented in conjunction with the second aspect, the power supply circuit 13 may generate the pulsating voltage Vo1, Vo2, or Vo3 such that a peak value Vp2 of the pulsating voltage Vo1, Vo2, or Vo3 becomes smaller than a peak value Vp2 of the input voltage Va or Vb.

This allows the power supply system 1, 1A, or 1B to reduce the chances of arc discharge continuing for a significant amount of time.

In a power supply system 1, 1A, or 1B according to a fourth aspect of the exemplary embodiment described above, which may be implemented in conjunction with the second or third aspect, the power supply circuit 13 may include an insulating circuit configured to electrically insulate the input unit 11 and the output unit 12 from each other.

Electrically insulating the input unit 11 and the output unit 12 from each other would enhance the electrical insulation of this power supply system 1, 1A, or 1B.

In a power supply system 1, 1A, or 1B according to a fifth aspect of the exemplary embodiment described above, which may be implemented in conjunction with any one of the second to fourth aspects, the power supply circuit 13 may include a voltage step-down circuit 131 and a rectifier circuit 132. The voltage step-down circuit 131 generates an AC voltage by stepping down the input voltage Va. The rectifier circuit 132 full-wave rectifies the AC voltage.

This power supply system 1, 1A, or 1B includes the rectifier circuit 132, which is connected to the output of the voltage step-down circuit 131, and therefore, an element with a relatively low breakdown voltage may be used for the rectifier circuit 132. This contributes to reducing the overall size and cost of the power supply circuit 13.

In a power supply system 1A or 1B according to a sixth aspect of the exemplary embodiment described above, which may be implemented in conjunction with any one of the first to fifth aspects, the power supply circuit 13 may include a signal generator 14 or 14A. The signal generator 14 or 14A transmits a signal through the pair of electric wires 21 and 22 by adjusting a waveform of a voltage between the pair of electric wires 21 and 22.

Thus, there is no need for the power supply system 1A or 1B to be newly provided with any control signal transmission line for transmitting a control signal to the lighting device 3a or any expensive radio frequency communications device as an additional component.

In a power supply system 1A according to a seventh aspect of the exemplary embodiment described above, which may be implemented in conjunction with the sixth aspect, the power supply circuit 13 may further include a power converter circuit 13A, 13B, 13C, or 13D configured to generate a first pulsating voltage Vo1 having the full-wave rectified waveform. The signal generator 14 may include: a series circuit of a first switching element Q11 and a second switching element Q12; and a capacitor C11. The first pulsating voltage Vo1 is applied between two terminals of the series circuit of the first switching element Q11 and the second switching element Q12. The capacitor C11 may be provided for a path parallel with the first switching element Q11 and electrically connected between a pair of output terminals 121 and 122. The signal generator 14 may perform a charge operation and a discharge operation to generate a second pulsating voltage Vo2 as the pulsating voltage in the capacitor C11. The charge operation may include charging the capacitor C11 with the first pulsating voltage Vo1 by turning the first switching element Q11 OFF and turning the second switching element Q12 ON. The discharge operation may include discharging the capacitor C11 by turning the first switching element Q11 ON and turning the second switching element Q12 OFF.

The power supply system 1A shapes the waveform of the second pulsating voltage Vo2 by performing a charge operation and a discharge operation on the capacitor C11, and therefore, is allowed to change the waveform more steeply, and maintain a higher communication rate, than in the case of feedback control.

In a power supply system 1A according to an eighth aspect of the exemplary embodiment described above, which may be implemented in conjunction with the seventh aspect, the path parallel with the first switching element Q11 may be provided with a series circuit of the capacitor C11 and an impedance element (inductor L11).

This allows the power supply system 1A to adjust the duration of charging and discharging the capacitor C11 using the impedance element.

In a power supply system 1A according to a ninth aspect of the exemplary embodiment described above, which may be implemented in conjunction with the seventh or eighth aspect, the signal generator 14 may generate the second pulsating voltage Vo2 by making duration of the discharge operation shorter than one cycle of the first pulsating voltage Vo1 and by turning a voltage waveform of the capacitor C11 into a waveform in which the waveform of the first pulsating voltage Vo1 is locally depressed.

This allows the power supply system 1A to transmit a digital signal of multiple bits within one cycle of the first pulsating voltage Vo1, thus improving the communication efficiency.

In a power supply system 1A according to a tenth aspect of the exemplary embodiment described above, which may be implemented in conjunction with any one of the seventh to ninth aspects, the signal generator 14 may change an operation mode from the charge operation into the discharge operation, or vice versa, in accordance with an externally input instruction signal.

This allows the power supply system 1A to pass the externally input instruction.

In a power supply system 1A according to an eleventh aspect of the exemplary embodiment described above, which may be implemented in conjunction with any one of the seventh to tenth aspects, the signal generator 14 suitably refrains from performing the discharge operation when an instantaneous value of the first pulsating voltage Vo1 is equal to or less than a threshold value.

This allows the power supply system 1A to reduce signal transmission errors.

In a power supply system 1A according to a twelfth aspect of the exemplary embodiment described above, which may be implemented in conjunction with any one of the seventh to eleventh aspects, the signal may define a communication frame as a component unit, and the signal generator 14 may transmit an integral number of communication frames within one cycle of the first pulsating voltage Vo1.

This allows the power supply system 1A to transmit a signal without dividing any communication frame over multiple cycles of the first pulsating voltage Vo1, thus improving the stability of communication.

In a power supply system 1B according to a thirteenth aspect of the exemplary embodiment described above, which may be implemented in conjunction with the sixth aspect, the signal generator 14A may transmit the signal through the pair of electric wires 21 and 22 by adjusting an output conduction angle $\theta 2$ representing a period during which the pulsating voltage Vo3 is applied to the pair of electric wires 21 and 22.

This allows the power supply system 1B to transmit a signal by performing phase control on the pulsating voltage.

In a power supply system 1B according to a fourteenth aspect of the exemplary embodiment described above, which may be implemented in conjunction with any one of the second to fifth aspects, the power supply circuit 13 may include a signal generator 14A. The signal generator 14A may transmit the signal through the pair of electric wires 21 and 22 by adjusting an output conduction angle $\theta 2$ representing a period during which the pulsating voltage Vo3 is applied to the pair of electric wires 21 and 22.

This allows the power supply system 1B to transmit a signal by performing phase control on the pulsating voltage.

A power supply system 1B according to a fifteenth aspect of the exemplary embodiment described above, which may be implemented in conjunction with the fourteenth aspect, may further include an input bleeder circuit 15. The input unit 11 may include a pair of input terminals 111 and 112. The input voltage Vb, obtained by adjusting, to a predetermined value, an input conduction angle $\theta 1$ representing a period during which the voltage Va is conductive through the pair of input terminals 111 and 112, may be applied to the pair of input terminals 111 and 112. The power supply circuit 13 may generate the pulsating voltage Vo3 at which the output conduction angle $\theta 2$ becomes equal to the predetermined value. The input bleeder circuit 15 may be electrically connected between the pair of input terminals 111 and 112. An impedance of the input bleeder circuit 15 between the pair of input terminals 111 and 112 may be adjusted in accordance with an instantaneous value of the input voltage Vb. The impedance of the input bleeder circuit 15 when the instantaneous value of the input voltage Vb is less than the threshold value may be lower than the impedance of the input bleeder circuit 15 when the instantaneous value of the input voltage Vb is equal to or greater than the threshold value.

This enables the power supply system 1B to stabilize the input conduction angle $\theta 1$ and secure a control power supply for the phase control switch 5 by allowing an input bleeder current Ib to flow in the vicinity of the zero cross point of the input voltage Va.

In a power supply system 1B according to a sixteenth aspect of the exemplary embodiment described above, which may be implemented in conjunction with the fifteenth aspect, the input bleeder circuit 15 may have its impedance adjusted to allow no input bleeder current Ib to flow between the pair of input terminals 111 and 112 when the instantaneous value of the input voltage Vb is equal to or greater than the threshold value. The input bleeder circuit 15 may also have its impedance adjusted to allow the input bleeder current Ib to flow between the pair of input terminals 111 and 112 when the instantaneous value of the input voltage Vb is less than the threshold value.

This enables the power supply system 1B to stabilize the input conduction angle $\theta1$ and secure a control power supply for the phase control switch 5 by allowing the input bleeder current Ib to flow in the vicinity of the zero cross point of the input voltage Va.

A power supply system 1B according to a seventeenth aspect of the exemplary embodiment described above, which may be implemented in conjunction with the fifteenth or sixteenth aspect, may further include an output bleeder circuit 16. The output unit 12 may include a pair of output terminals 121 and 122. The pulsating voltage Vo3 may be applied to the pair of output terminals 121 and 122. A plurality of threshold values are set for the instantaneous value of the input voltage Vb. The plurality of threshold values include a first threshold value and a second threshold value. The first threshold value is set as the threshold value for the input bleeder circuit 15. The output bleeder circuit 16 may be electrically connected between the pair of output terminals 121 and 122, and may adjust an impedance of the output bleeder circuit 16 between the pair of output terminals 121 and 122 in accordance with the instantaneous value of the input voltage Vb. The impedance of the output bleeder circuit 16 when the instantaneous value of the input voltage Vb is less than the second threshold value may be lower than the impedance of the output bleeder circuit 16 when the instantaneous value of the input voltage Vb is equal to or greater than the second threshold value.

Thus, even when the light intensity level comes close to the lower limit of dimming, this power supply system 1B does not allow the waveform of the pulsating voltage Vo3 to be distorted easily and thereby improves the stability of communication.

In a power supply system 1B according to an eighteenth aspect of the exemplary embodiment described above, which may be implemented in conjunction with the seventeenth aspect, the output bleeder circuit 16 may have its impedance adjusted to allow no output bleeder current Ic to flow between the pair of output terminals 121 and 122 when the instantaneous value of the input voltage Vb is equal to or greater than the second threshold value. The output bleeder circuit 16 may also have its impedance adjusted to allow the output bleeder current Ic to flow between the pair of output terminals 121 and 122 when the instantaneous value of the input voltage Vb is less than the second threshold value.

Thus, even when the light intensity level comes close to the lower limit of dimming, this power supply system 1B does not allow the waveform of the pulsating voltage Vo3 to be distorted easily and thereby improves the stability of communication.

A lighting device 3a according to a nineteenth aspect of the exemplary embodiment described above is supplied with DC power through the pair of electric wires 21 and 22 from the power supply system 1, 1A, or 1B of any one of the first to eighteenth aspects described above. The lighting device 3a includes a lighting circuit 32 configured to supply the load power to the light source 3b. The lighting circuit 32 is implemented as a power-factor correction circuit configured to regulate an amount of a current flowing through the pair of electric wires 21 and 22 into the lighting circuit 32 to increase a power factor of AC power to be input to the power supply circuit 13.

This allows the lighting device 3a to increase the power factor of the AC power supplied from the utility power supply 9 to the power supply system 1, 1A, or 1B, compared to a situation where the lighting circuit 32 does not function as a power-factor correction circuit.

A lighting device 3a according to a twentieth aspect of the exemplary embodiment described above is supplied with DC power through the pair of electric wires 21 and 22 from the power supply system 1A of any one of the sixth to twelfth aspects described above. The lighting device 3a includes: a lighting circuit 32 configured to supply the load power to the light source 3b; and a communications unit 33 configured to demodulate the signal based on a voltage between the pair of electric wires 21 and 22. The lighting circuit 32 regulates the load power based on the signal that has been demodulated by the communications unit 33.

This enables the lighting device 3a to receive both the load power and the signal through the pair of electric wires 21 and 22 and to control the load based on the signal.

In a lighting device 3a according to a twenty-first aspect of the exemplary embodiment described above, which may be implemented in conjunction with the twentieth aspect, the communications unit 33 may demodulate the signal based on either a variation in the voltage between the pair of electric wires 21 and 22 in a predetermined time or a result of comparison of the voltage between the pair of electric wires 21 and 22 with a signal threshold value.

This enables the lighting device 3a to receive the signal through the pair of electric wires 21 and 22.

A lighting device 3a according to a twenty-second aspect of the exemplary embodiment described above is supplied with DC power through the pair of electric wires 21 and 22 from the power supply system 1B of any one of the thirteenth to eighteenth aspects described above. The lighting device 3a includes: a lighting circuit 32 configured to supply the load power to the light source 3b; and a communications unit 33 configured to demodulate the signal by detecting the output conduction angle $\theta2$ based on a voltage between the pair of electric wires 21 and 22. The lighting circuit 32 regulates the load power based on the signal that has been demodulated by the communications unit 33.

This enables the lighting device 3a to receive both the load power and the signal through the pair of electric wires 21 and 22 and to control the load based on the signal.

In a lighting device 3a according to a twenty-third aspect of the exemplary embodiment described above, which may be implemented in conjunction with the twenty-second aspect, the communications unit 33 may detect the output conduction angle $\theta2$ by comparing the voltage between the pair of electric wires 21 and 22 with a conduction threshold value.

This enables the lighting device 3a to receive the signal through the pair of electric wires 21 and 22.

In a lighting device 3a according to a twenty-fourth aspect of the exemplary embodiment described above, which may be implemented in conjunction with the twenty-third aspect, the lighting circuit 32 may control the load power based on the output conduction angle θ2. As the output conduction angle θ2 increases from a lower limit value θ21 thereof, the load power may increase gradually. Before the output conduction angle θ2 increasing reaches an upper limit value θ23 thereof, the load power may become maximum.

This allows the lighting device 3a to control the load power such that the load power is maximized within a range in which the output conduction angle θ2 is adjustable.

In a lighting device 3a according to a twenty-fifth aspect of the exemplary embodiment described above, which may be implemented in conjunction with the twenty-third aspect, the lighting circuit 32 may control the load power based on the output conduction angle θ2. As the output conduction angle θ2 increases from a lower limit value θ21 thereof, the load power may increase gradually. Before the output conduction angle θ2 increasing reaches an upper limit value θ23 thereof, there may be a deflection point of the load power.

This allows the lighting device 3a to control the load power such that the load power curve has a deflection point within a range in which the output conduction angle θ2 is adjustable.

In a lighting device 3a according to a twenty-sixth aspect of the exemplary embodiment described above, which may be implemented in conjunction with the twenty-third aspect, the signal may be a binary digital signal generated in compliance with a predetermined communications protocol, and the communications unit 33 may demodulate the digital signal by determining the output conduction angle θ2.

This allows the lighting device 3a to receive the digital signal through the pair of electric wires 21 and 22.

In a lighting device 3a according to a twenty-seventh aspect of the exemplary embodiment described above, which may be implemented in conjunction with any one of the twenty-second to twenty-sixth aspects, the signal may be a light intensity control signal instructing a light intensity level of the light source 3b. The light source 3b may include two or more types of light source modules 301 and 302 emitting light rays in mutually different colors. The lighting circuit 32 may supply the load power on an individual basis to each of the two or more types of light source modules 301 and 302, and may regulate the load power to be supplied on an individual basis to each of the two or more types of light source modules 301 and 302 according to the light intensity level instructed by the light intensity control signal.

This allows the lighting device 3a to control the light intensity and light color of the light source modules 301 and 302 just by changing the output conduction angle θ2.

An illumination system S1 according to a twenty-eighth aspect of the exemplary embodiment described above includes: the power supply system 1, 1A, or 1B of any one of the first to sixteenth aspects described above; the lighting device 3a of the nineteenth aspect described above; and a pair of electric wires 21 and 22 configured to electrically connect the power supply system 1, 1A, or 1B and the lighting device 3a together. The lighting device 3a includes a lighting circuit 32 configured to supply the load power to the light source 3b. The lighting circuit 32 is implemented as a power-factor correction circuit configured to regulate an amount of a current flowing through the pair of electric wires 21 and 22 into the lighting circuit 32 to increase a power factor of AC power to be input to the power supply circuit 13.

Therefore, even if arc discharge is generated, for example, at a node at which the electric wire 21 or 22 is connected or at a node at which the electric wire 21 or 22 is disconnected, the chances of arc extinction will increase, and the chances of arc discharge continuing will decrease, in this illumination system S1.

An illumination system S2 according to a twenty-ninth aspect of the exemplary embodiment described above includes: the power supply system 1A of any one of the sixth to twelfth aspects described above; the lighting device 3a of the twentieth or twenty-first aspect described above; and a pair of electric wires 21 and 22 configured to electrically connect the power supply system 1A and the lighting device 3a together. The lighting device 3a includes: a lighting circuit 32 configured to supply the load power to the light source 3b; and a communications unit 33 configured to demodulate the signal based on a voltage between the pair of electric wires 21 and 22. The lighting circuit 32 regulates the load power based on the signal that has been demodulated by the communications unit 33.

Therefore, even if arc discharge is generated, for example, at a node at which the electric wire 21 or 22 is connected or at a node at which the electric wire 21 or 22 is disconnected, the chances of arc extinction will increase, and the chances of arc discharge continuing will decrease, in this illumination system S2.

An illumination system S3 according to a thirtieth aspect of the exemplary embodiment described above includes: the power supply system 1B of any one of the sixth, thirteenth, or eighteenth aspect described above; the lighting device 3a of the twenty-second or twenty-seventh aspect described above; and a pair of electric wires 21 and 22 configured to electrically connect the power supply system 1B and the lighting device 3a together. The signal generator 14A transmits the signal through the pair of electric wires 21 and 22 by adjusting an output conduction angle θ2 representing a period during which the pulsating voltage Vo3 is applied to the pair of electric wires 21 and 22. The lighting device 3a includes: a lighting circuit 32 configured to supply the load power to the light source 3b; and a communications unit 33 configured to demodulate the signal by detecting the output conduction angle θ2 based on a voltage between the pair of electric wires 21 and 22. The lighting circuit 32 regulates the load power based on the signal that has been demodulated by the communications unit 33.

Therefore, even if arc discharge is generated, for example, at a node at which the electric wire 21 or 22 is connected or at a node at which the electric wire 21 or 22 is disconnected, the chances of arc extinction will increase, and the chances of arc discharge continuing will decrease, in this illumination system S3.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply system configured to output a DC pulsating voltage to a pair of electric wires through which load power is supplied to a light source, the power supply system comprising:
   a power supply circuit configured to generate the pulsating voltage;
   an output unit to be connected to the pair of electric wires to apply the pulsating voltage to the pair of electric wires; and an input unit configured to receive an AC input voltage as an input voltage, the power supply circuit generating the pulsating voltage such that the pulsating voltage has a full-wave rectified waveform obtained by full-wave rectifying an alternating voltage as a wave alternating between a positive voltage and a negative voltage, the power supply circuit generating the pulsating voltage based on the input voltage, and the pulsating voltage having a full-wave rectified waveform of the same phase as the input voltage.

2. The power supply system of claim 1, wherein
the power supply circuit includes an insulating circuit configured to electrically insulate the input unit and the output unit from each other.

3. The power supply system of claim 1, wherein
the power supply circuit includes:
a voltage step-down circuit configured to generate an AC voltage by stepping down the input voltage; and
a rectifier circuit configured to full-wave rectify the AC voltage.

4. The power supply system of claim 1, wherein
the power supply circuit includes a signal generator configured to transmit a signal through the pair of electric wires by adjusting a waveform of a voltage between the pair of electric wires.

5. The power supply system of claim 4, wherein
the power supply circuit further includes a power converter circuit configured to generate a first pulsating voltage having the full-wave rectified waveform, the signal generator includes: a series circuit of a first switching element and a second switching element; and a capacitor provided for a path parallel with the first switching element and electrically connected between a pair of output terminals, the first pulsating voltage being applied between two terminals of the series circuit of the first switching element and the second switching element, the signal generator performs a charge operation of charging the capacitor with the first pulsating voltage by turning the first switching element OFF and turning the second switching element ON, and also performs a discharge operation of discharging the capacitor by turning the first switching element ON and turning the second switching element OFF to generate a second pulsating voltage as the pulsating voltage in the capacitor.

6. The power supply system of claim 5, wherein
the path parallel with the first switching element is provided with a series circuit of the capacitor and an impedance element.

7. The power supply system of claim 5, wherein
the signal generator generates the second pulsating voltage by making duration of the discharge operation shorter than one cycle of the first pulsating voltage and by turning a voltage waveform of the capacitor into a waveform in which the waveform of the first pulsating voltage is locally depressed.

8. The power supply system of claim 5, wherein
the signal generator changes an operation mode from the charge operation into the discharge operation, or vice versa, in accordance with an externally input instruction signal.

9. The power supply system of claim 5, wherein
the signal generator refrains from performing the discharge operation when an instantaneous value of the first pulsating voltage is equal to or less than a threshold value.

10. The power supply system of claim 5, wherein
the signal defines a communication frame as a component unit, and
the signal generator transmits an integral number of communication frames within one cycle of the first pulsating voltage.

11. The power supply system of claim 4, wherein
the signal generator transmits the signal through the pair of electric wires by adjusting an output conduction angle representing a period during which the pulsating voltage is applied to the pair of electric wires.

12. The power supply system of claim 1, wherein
the power supply circuit includes a signal generator configured to transmit the signal through the pair of electric wires by adjusting an output conduction angle representing a period during which the pulsating voltage is applied to the pair of electric wires.

13. The power supply system of claim 12, further comprising an input bleeder circuit, wherein
the input unit includes a pair of input terminals, the input voltage obtained by adjusting, to a predetermined value, an input conduction angle, representing a period during which a voltage is conductive through the pair of input terminals, being applied to the pair of input terminals, the power supply circuit generates the pulsating voltage at which the output conduction angle becomes equal to the predetermined value, the input bleeder circuit is electrically connected between the pair of input terminals, an impedance of the input bleeder circuit between the pair of input terminals being adjusted in accordance with an instantaneous value of the input voltage, and the impedance of the input bleeder circuit when the instantaneous value of the input voltage is less than the threshold value is lower than the impedance of the input bleeder circuit when the instantaneous value of the input voltage is equal to or greater than the threshold value.

14. The power supply system of claim 13, wherein
the input bleeder circuit has its impedance adjusted to allow no input bleeder current to flow between the pair of input terminals when the instantaneous value of the input voltage is equal to or greater than the threshold value and to allow the input bleeder current to flow between the pair of input terminals when the instantaneous value of the input voltage is less than the threshold value.

15. The power supply system of claim 13, further comprising an output bleeder circuit, wherein
the output unit includes a pair of output terminals, the pulsating voltage being applied to the pair of output terminals, a plurality of threshold values are set for the instantaneous value of the input voltage, the plurality of threshold values including a first threshold value and a second threshold value, the first threshold value being set as the threshold value for the input bleeder circuit, the output bleeder circuit is electrically connected between the pair of output terminals, and adjusts an impedance of the output bleeder circuit between the pair of output terminals in accordance with the instantaneous value of the input voltage, and the impedance of the output bleeder circuit when the instantaneous value of the input voltage is less than the second threshold value is lower than the impedance of the output bleeder circuit when the instantaneous value of the input voltage is equal to or greater than the second threshold value.

16. The power supply system of claim 15, wherein the output bleeder circuit has its impedance adjusted to allow no output bleeder current to flow between the pair of output terminals when the instantaneous value of the input voltage is equal to or greater than the second threshold value and to allow the output bleeder current to flow between the pair of output terminals when the instantaneous value of the input voltage is less than the second threshold value.

17. A lighting device to be supplied with DC power through the pair of electric wires from the power supply system of claim 1, the lighting device comprising a lighting circuit configured to supply the load power to the light source,
the lighting circuit being implemented as a power-factor correction circuit configured to regulate an amount of a current flowing through the pair of electric wires into the lighting circuit to increase a power factor of AC power to be input to the power supply circuit.

18. A lighting device to be supplied with DC power through the pair of electric wires from the power supply system of claim 4,
the lighting device comprising:
a lighting circuit configured to supply the load power to the light source; and
a communications unit configured to demodulate the signal based on a voltage between the pair of electric wires, wherein
the lighting circuit regulates the load power based on the signal that has been demodulated by the communications unit.

19. The lighting device of claim 18, wherein the communications unit demodulates the signal based on either a variation in the voltage between the pair of electric wires in a predetermined time or a result of comparison of the voltage between the pair of electric wires with a signal threshold value.

20. A lighting device to be supplied with DC power through the pair of electric wires from the power supply system of claim 11,
the lighting device comprising:
a lighting circuit configured to supply the load power to the light source; and
a communications unit configured to demodulate the signal by detecting the output conduction angle based on a voltage between the pair of electric wires, wherein
the lighting circuit regulates the load power based on the signal that has been demodulated by the communications unit.

21. The lighting device of claim 20, wherein the communications unit detects the output conduction angle by comparing the voltage between the pair of electric wires with a conduction threshold value.

22. The lighting device of claim 21, wherein the lighting circuit controls the load power based on the output conduction angle,
as the output conduction angle increases from a lower limit value thereof, the load power increases gradually, and
before the output conduction angle increasing reaches an upper limit value thereof, the load power becomes maximum.

23. The lighting device of claim 21, wherein the lighting circuit controls the load power based on the output conduction angle,
as the output conduction angle increases from a lower limit value thereof, the load power increases gradually, and
before the output conduction angle increasing reaches an upper limit value thereof, there is a deflection point of the load power.

24. The lighting device of claim 21, wherein the signal is a binary digital signal generated in compliance with a predetermined communications protocol, and
the communications unit demodulates the binary digital signal by determining the output conduction angle.

25. The lighting device of claim 20, wherein the signal is a light intensity control signal instructing a light intensity level of the light source,
the light source includes two or more types of light source modules emitting light rays in mutually different colors, and
the lighting circuit supplies the load power on an individual basis to each of the two or more types of light source modules, and regulates the load power to be supplied on an individual basis to each of the two or more types of light source modules according to the light intensity level instructed by the light intensity control signal.

26. An illumination system comprising:
the power supply system of claim 1;
the lighting device including a lighting circuit configured to supply the load power to the light source, the lighting circuit being implemented as a power-factor correction circuit configured to regulate an amount of a current flowing through the pair of electric wires into the lighting circuit to increase a power factor of AC power to be input to the power supply circuit; and
a pair of electric wires configured to electrically connect the power supply system and the lighting device together.

27. An illumination system comprising:
the power supply system of claim 4;
the lighting device including a lighting circuit configured to supply the load power to the light source and a communications unit configured to demodulate the signal based on a voltage between the pair of electric wires, the lighting circuit regulating the load power based on the signal that has been demodulated by the communications unit; and
a pair of electric wires configured to electrically connect the power supply system and the lighting device together.

28. An illumination system comprising:
the power supply system of claim 4, the signal generator transmitting the signal through the pair of electric wires by adjusting an output conduction angle representing a period during which the pulsating voltage is applied to the pair of electric wires;
the lighting device including a lighting circuit configured to supply the load power to the light source; and a communications unit configured to demodulate the signal by detecting the output conduction angle based on a voltage between the pair of electric wires, the lighting circuit regulating the load power based on the signal that has been demodulated by the communications unit; and a pair of electric wires configured to electrically connect the power supply system and the lighting device together.

29. The power supply system of claim 1, wherein
the power supply circuit generates the pulsating voltage such that a peak value of the pulsating voltage becomes smaller than a peak value of the input voltage.

* * * * *